(12) United States Patent
Hay

(10) Patent No.: US 10,083,430 B2
(45) Date of Patent: Sep. 25, 2018

(54) COMPUTER-CONTROLLED, UNATTENDED, AUTOMATED CHECKOUT STORE OUTLET SYSTEM AND RELATED METHOD

(71) Applicant: Ronny Hay, Encino, CA (US)

(72) Inventor: Ronny Hay, Encino, CA (US)

( * ) Notice: Subject to any disclaimer, the term of this patent is extended or adjusted under 35 U.S.C. 154(b) by 738 days.

(21) Appl. No.: 13/912,006

(22) Filed: Jun. 6, 2013

(65) Prior Publication Data

US 2013/0332271 A1    Dec. 12, 2013

Related U.S. Application Data

(60) Provisional application No. 61/657,566, filed on Jun. 8, 2012, provisional application No. 61/809,756, filed on Apr. 8, 2013.

(51) Int. Cl.
*G06Q 20/20* (2012.01)
*G07G 1/00* (2006.01)
*A47F 9/04* (2006.01)

(52) U.S. Cl.
CPC ............. *G06Q 20/20* (2013.01); *A47F 9/048* (2013.01); *G06Q 20/202* (2013.01); *G06Q 20/203* (2013.01); *G07G 1/0036* (2013.01)

(58) Field of Classification Search
CPC ..... G06Q 20/20; G06Q 20/202; G06Q 20/203
USPC ..................................... 705/16, 22
See application file for complete search history.

(56) References Cited

U.S. PATENT DOCUMENTS

| | | |
|---|---|---|
| 2,905,926 A | 9/1959 | Aid |
| 3,716,697 A | 2/1973 | Weir |
| 4,317,604 A | 3/1982 | Krakauer |
| 4,573,606 A | 3/1986 | Lewis et al. |
| 4,866,661 A | 9/1989 | de Prins |
| 5,339,250 A | 8/1994 | Durbin |
| 5,478,989 A | 12/1995 | Shepley |
| 5,703,785 A | 12/1997 | Bluemel et al. |
| 5,728,999 A * | 3/1998 | Teicher .................. G06Q 20/04 235/380 |
| 5,905,653 A | 5/1999 | Higham et al. |
| 6,039,467 A | 3/2000 | Holmes |
| 6,102,162 A | 8/2000 | Teicher |
| 6,131,399 A | 10/2000 | Hall |
| 6,409,027 B1 | 6/2002 | Chang et al. |

(Continued)

FOREIGN PATENT DOCUMENTS

| | | |
|---|---|---|
| CN | 101996447 A | 3/2011 |
| JP | 2002032865 A | 1/2002 |

(Continued)

*Primary Examiner* — Florian M Zeender
*Assistant Examiner* — Christopher R Buchanan
(74) *Attorney, Agent, or Firm* — Fulwider Patton LLP

(57) ABSTRACT

An unattended, automated checkout, computer-controlled automated store outlet and system is disclosed. A customer's identification and payment information are inputted and verified and the customer qualified to remove items from the automated store outlet. Each bay of the automated store outlet is normally locked, and after the customer accesses the bay can remove one or more items from the bay, which are automatically detected and identified and charged to the customer as part of the purchase transaction. These events occur at the location of each automated store outlet. Each automated store outlet communicates with a central control center, which can be used for live customer service and real time surveillance.

63 Claims, 15 Drawing Sheets

(56) References Cited

U.S. PATENT DOCUMENTS

| | | |
|---|---|---|
| 6,556,889 B2 | 4/2003 | Rudick et al. |
| 6,640,159 B2 | 10/2003 | Holmes et al. |
| 6,848,114 B2 | 1/2005 | Mueller et al. |
| 7,006,893 B2 | 2/2006 | Hart et al. |
| 8,028,822 B2 | 10/2011 | Braunstein |
| 8,140,187 B2 | 3/2012 | Campbell et al. |
| 8,191,719 B2 | 6/2012 | Van Ooyen et al. |
| 8,482,429 B2 | 7/2013 | Aguren |
| 8,510,168 B2 * | 8/2013 | Pitsch .................. A45D 44/00 705/16 |
| 2002/0186133 A1 | 12/2002 | Loof |
| 2002/0190845 A1 | 12/2002 | Moore |
| 2003/0197061 A1 | 10/2003 | Din |
| 2005/0067426 A1 | 3/2005 | Holdway et al. |
| 2005/0080510 A1 | 4/2005 | Bates et al. |
| 2006/0102645 A1 * | 5/2006 | Walker ................. G06Q 10/087 221/75 |
| 2006/0164247 A1 | 7/2006 | Overhultz et al. |
| 2007/0185615 A1 | 8/2007 | Bossi et al. |
| 2008/0052175 A1 * | 2/2008 | Walker ................. G06Q 10/087 705/16 |
| 2008/0188980 A1 | 8/2008 | Home |
| 2009/0306820 A1 | 12/2009 | Simmons et al. |
| 2010/0138037 A1 * | 6/2010 | Adelberg ............. G06Q 10/087 700/241 |
| 2010/0262282 A1 | 10/2010 | Segal et al. |
| 2011/0245965 A1 * | 10/2011 | Farrell .................. G06Q 20/20 700/232 |
| 2011/0295417 A1 * | 12/2011 | Smith, III ............. G07F 9/006 700/235 |
| 2011/0301749 A1 * | 12/2011 | Hammonds ........... G07F 11/38 700/232 |
| 2012/0004769 A1 | 1/2012 | Hallenbeck et al. |
| 2012/0029690 A1 * | 2/2012 | Bruck ..................... G07F 9/10 700/232 |
| 2012/0029691 A1 | 2/2012 | Mockus et al. |
| 2012/0130535 A1 | 5/2012 | Kropp et al. |
| 2012/0200385 A1 | 8/2012 | Savage et al. |
| 2013/0030566 A1 | 1/2013 | Shavelsky et al. |
| 2013/0035787 A1 | 2/2013 | Canter |
| 2014/0025391 A1 | 1/2014 | Knowles et al. |

FOREIGN PATENT DOCUMENTS

| | | |
|---|---|---|
| JP | 2007087290 A | 4/2007 |
| KR | 101021590 B1 | 3/2011 |
| WO | 1996038798 A1 | 12/1996 |

* cited by examiner

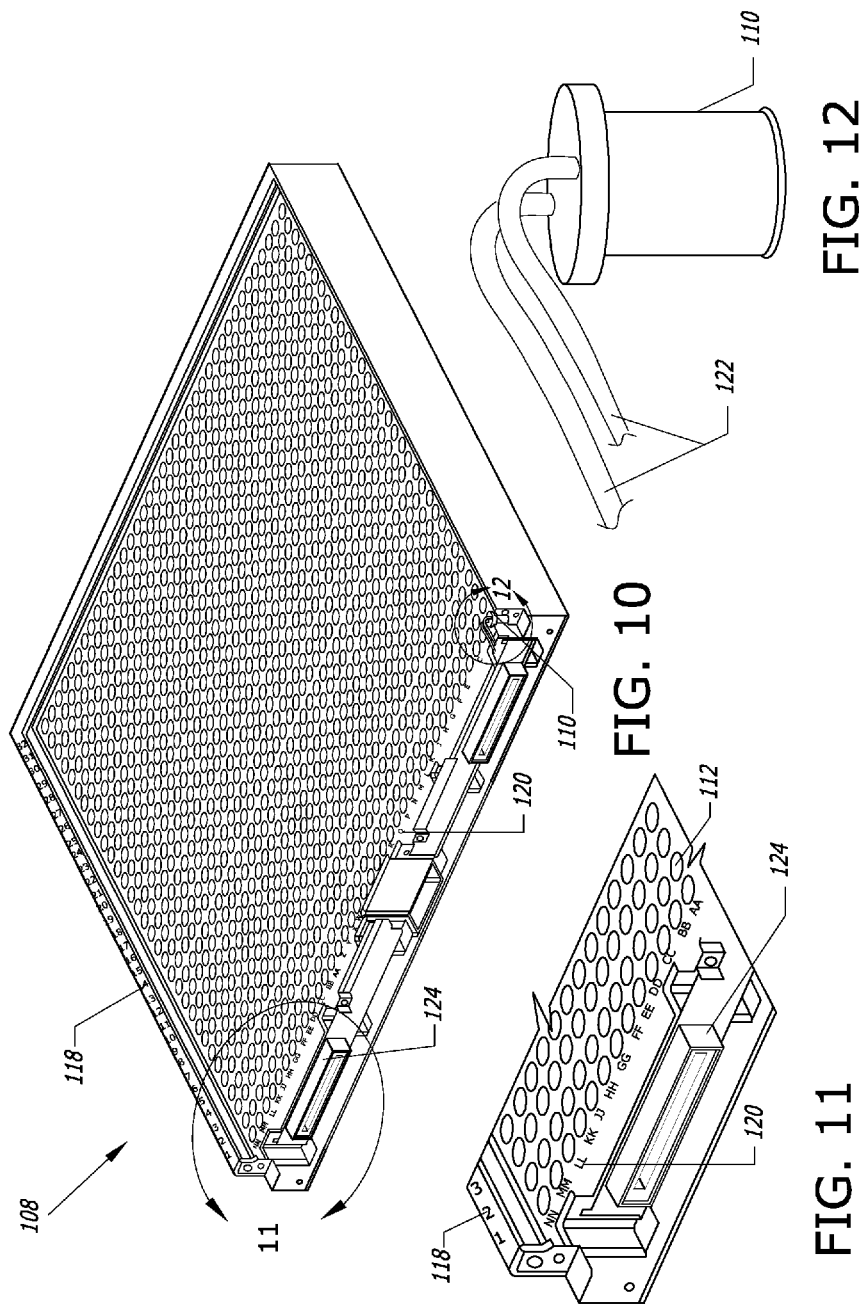

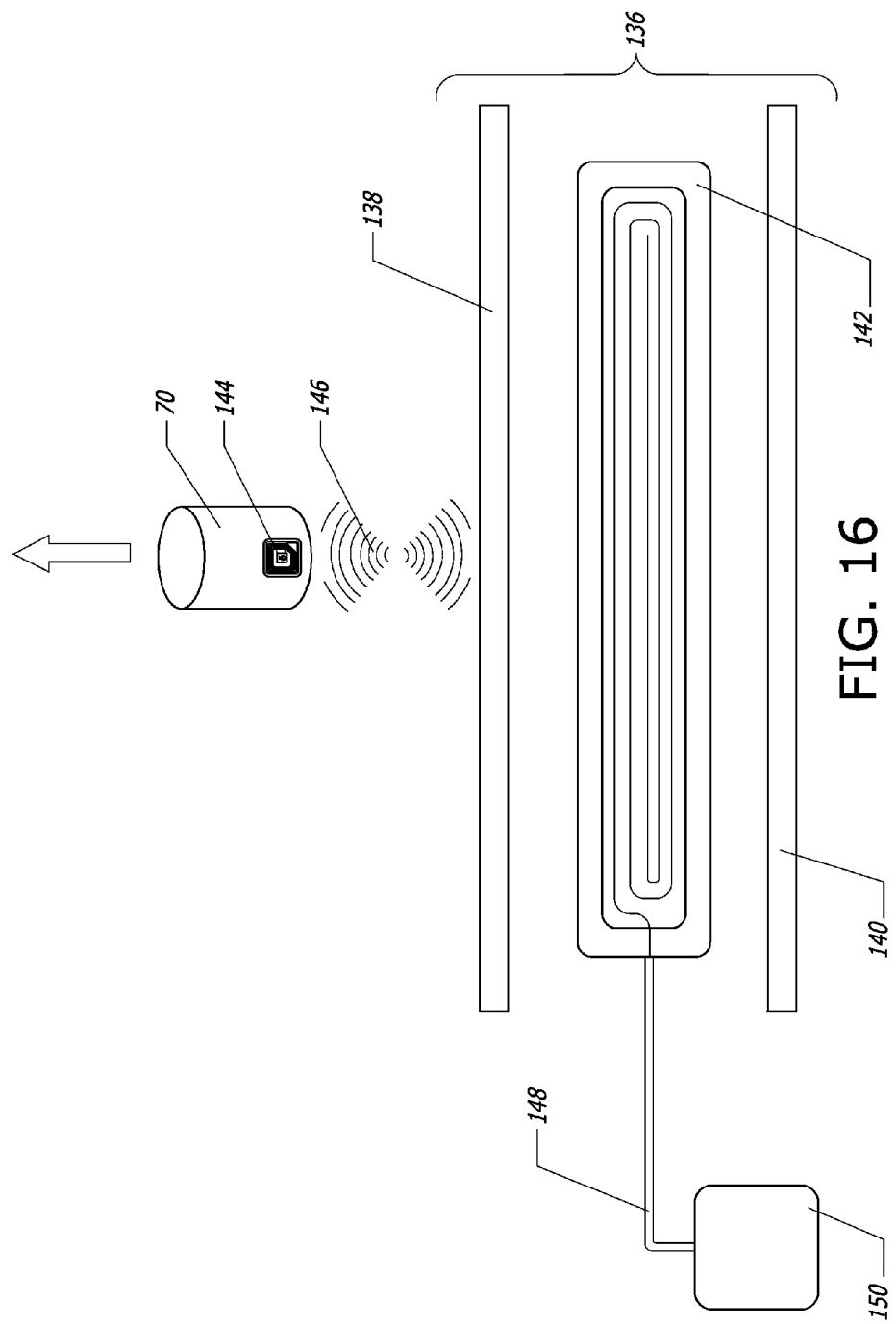

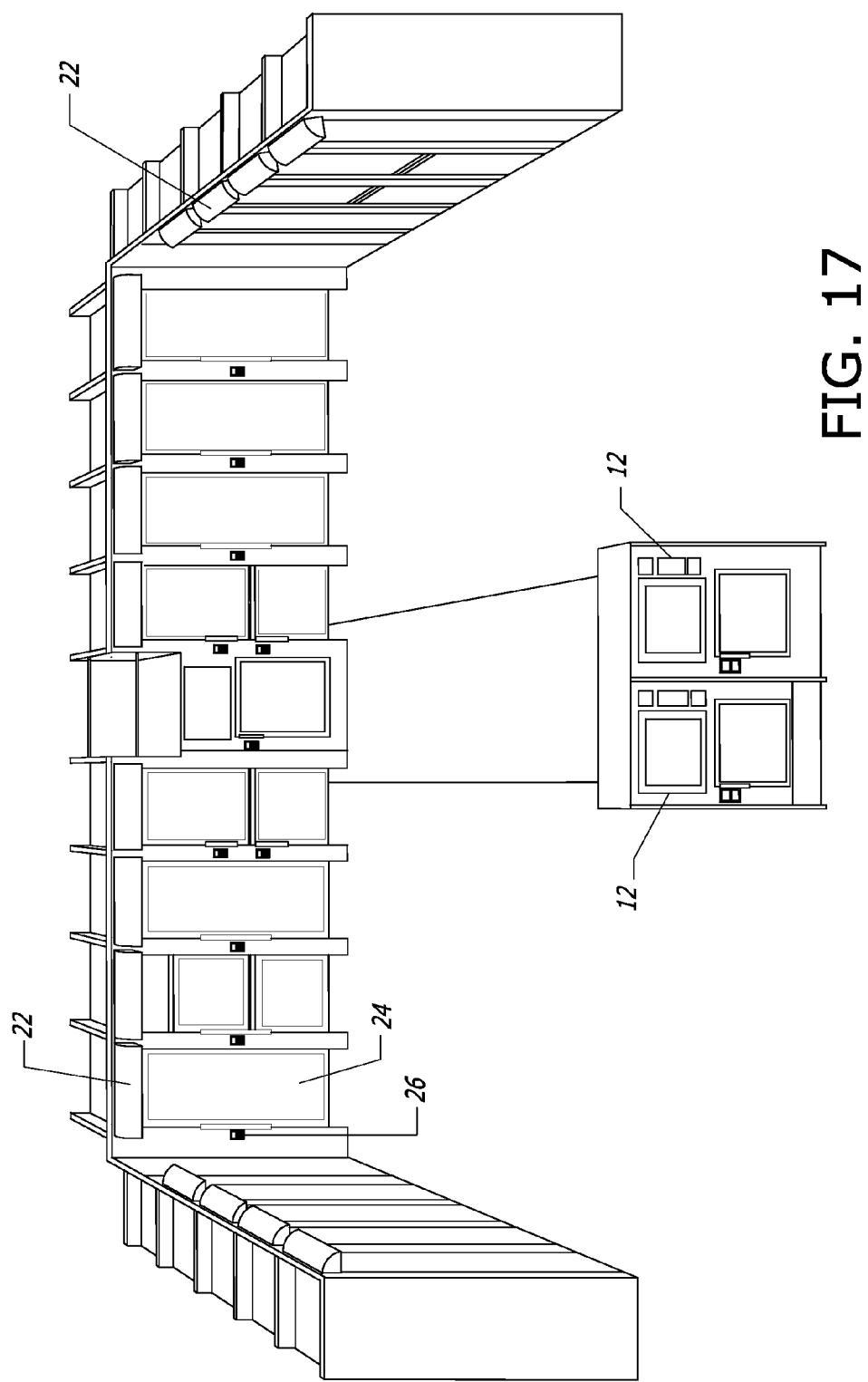

COMPUTER-CONTROLLED, UNATTENDED, AUTOMATED CHECKOUT STORE OUTLET SYSTEM AND RELATED METHOD

BACKGROUND OF THE INVENTION

The present invention generally relates to an unattended, automated checkout store outlet system, and its related method. This Automated Store Outlet system can be used as an unattended automated checkout kiosk or micro-market, as well as any other unattended automated checkout mini-market or neighborhood store, where consumer goods are displayed behind closed glass doors and are a sold "off the shelf".

Typically, kiosks or micro-markets as well as mini-markets or neighborhood convenience stores require the presence of clerks and other employees and may be limited to specific hours of operation. Such requirements and limitations increase the cost of operation and the limited hours of operation affect the actual revenue.

Some recent unattended micro-markets are operated within a company's break-room and are offering food and beverages "off-the-shelf" using the honor system. In such micro-markets, consumers can pick up items off the open and unsecured shelves and then the consumers are required to scan the barcodes of each item at the barcode scanner located on the local automated computer kiosk. Such open shelf micro-markets are limited to only highly secured locations and are subject to losses due to theft. Therefore, such micro-markets must be located only within the company's break-room or in such areas where the identity of the customers are known and the potential theft is mitigated.

Additionally, this invention can also be an alternative to common vending machines which are currently used to vend products which are stored within the machine. Typically, vending machines are coin-operated, although many vending machines accept varying denominations of paper currency (such as a one-dollar or five-dollar bill), and some vending machines now accept credit or debit cards. Vending machines are often placed where people gather, pass by, or wait, such as public buildings and transportation hubs including subways and airports, hospitals, schools, etc.

In the common vending machine, after the appropriate number of coins or bill payment is made, and the good selected, the good is typically dropped or delivered into a built-in bin which is accessible to the customer for retrieving the product. Such vending machines are very limited to a low number of products and to a very small selection. Vending machines are typically associated with selling high-sugar, low-nutrient snacks and drinks, such as candy bars, potato chips and soft drinks. Furthermore, the ordinary metal square vending machine, in most cases, is not appealing and does not have an attractive appearance. Nowadays the bad reputation and the negative social stigma of vending machines are counted as some of the main reason that large percentage of consumers are avoiding the use of conventional vending machines. Furthermore, vending machines are not allowing consumers to examine or return the items into the machine and reverse the sale. The sale process is unfriendly and upon vending the product each sale becomes final.

Traditional vending machines also do not have very many security measures, other than tamper-proofing. Thus, pranksters and thieves can damage the vending machine, and in some cases remove the money deposited within the vending machine. There is no live twenty-four hour surveillance of such vending machines.

Yet another drawback of company micro-markets and traditional vending machines is that there is no real time communication between the consumer and the operator of the micro market or the vending machine, should problems or questions arise. The customer can attempt to call the operator of the micro-market or the vending machine, if the contact information of the operator is posted. Otherwise, more typically, the customer is unable to contact such operators during such visits to the micro-market or the use of the vending machine.

Therefore, under the current situation and in most cases, if an individual desires to have something to eat or drink which is more substantial or healthier than a candy bar, soda, etc., or desires to buy any personal, toiletries or conventional items, that individual must either find and purchase such products at a grocery store, a restaurant or other type of convenience stores. In other cases, there are gift shops, coffee shops or the like which may be placed in the lobby of hotels or buildings or within the waiting area of an airport which will offer such products. However, these are typically only open during limited hours of each day and require one or more people to be present to handle the purchases from the consuming public.

Accordingly, there is a continuing need for automated checkout store outlets which feature an automated "off the shelf" selling method and system which is appealing and attractive in appearance and offers a wide selection of products. What is also needed is such an automated system which can offer better and more nutritious food than most vending machines without restriction to location or hours of operation. The present invention fulfills these needs, and provides other related advantages.

SUMMARY OF THE INVENTION

The present invention is directed to an unattended, automated checkout store outlet system. More particularly, the present invention is directed to a method for selling items from such a computer-controlled, automated store outlet.

A computer-controlled, automated store outlet is provided. The automated store outlet has at least one check-in station and one bay containing items removable from the bay for purchase. The automated store outlet includes a check-in station for customer identification, payment, and the like. The one or more bays of the automated store outlet are normally locked to prevent access to the items within the bay. Typically, items are arranged within compartments of each tray. A plurality of sensors are arranged to correspond with the items held by the trays.

Customer identification is input into the check-in station of the automated store outlet, such as inputting at least one of a customer identification code and/or password, customer's unique images of QR or the like, swiping an electronically readable card or electronic device, or providing biometric information of the customer, such as facial recognition, fingerprint, eye scan or the like. The customer identification is verified by the system.

Customer payment information is also input into the check-in station of the automated store outlet, and the customer payment information is verified by the system. The customer payment information may comprise inputting information related to previously created customer automated store outlet dedicated account, credit or debit card account information, or depositing cash into a cash receiving device of the automated store outlet. The customer may transfer funds to the customer's automated store dedicated account on line or using the check-in station of the automated store outlet as well.

In accordance with the invention, the customer is qualified by the system to remove items from the at least one bay after first determining that the customer payment information is of a sufficient level to purchase items from the at least one bay at the automated store outlet.

After the customer has been identified, the customer's payment information verified, and the customer qualified, the customer is then allowed to shop at the automated store outlet. This requires unlocking a door to provide access to a bay. Typically, this requires that the customer provide identification information to an electronic unit associated with a lock at each bay door. This may be by means of an electronic unit which performs multiple scanning and reading and display functions simultaneously, including a motion detector, an electronic display screen, a keypad, two-way audio visual communication means, RFID reader, electronic code image reader, and a biometric scanner. The customer identification is verified before unlocking the door. Once the door is unlocked and opened, the system tracks the customer's activity at that bay.

When an item is removed from the bay, such as from a compartment of a tray of the bay, the system detects the removal of the item from the bay. The system also identifies the removed item and sends the identification of the removed item to an electronic shopping cart for that customer at a computer located at the automated store outlet.

The detection of the removal of an item from the bay can be done by a variety of means. Typically, a sensor is associated with each item within the bay. For example, the sensor may comprise a light sensor disposed below the item and exposed to light, and thus actuated, when the item is removed from the tray. Typically, compartments are formed in the tray using horizontal and vertical dividers or prefabricated dividers, and an item and a photosensor is assigned to each compartment. As the items and sensors are arranged in association with the tray within the bay, removal of a particular item triggers a sensor and the system can determine exactly which item was removed from the tray within the bay.

Alternatively, the detection of the removal of an item from the bay comprises the steps of associating an RFID tag with each item on the tray. A corresponding RFID detector is utilized to detect the movement of the item away from the tray and from the bay. The RFID detector, in a particularly preferred embodiment, comprises an RFID antenna sandwiched between an upper and a base layer and forming a sensor tray which is positioned relative to the items in the bay so as to detect movement and removal of the item from the tray and bay.

If the customer returns the item into the bay, the item is removed from the electronic shopping cart of the purchaser. However, when the bay door is closed, it is automatically locked. After the customer has completed his or her shopping session, the purchase transaction is closed and the customer is charged for the one or more removed items. Closing the purchase transaction can comprise the customer closing the purchase transaction using the check-in station at the automated store outlet. The customer may request display of the removed items and their purchase prices by viewing the shopping cart at a computer-controlled display unit of the check-in station. Alternatively, the system will automatically close the transaction and charge the customer for the removed item after a predetermined period of customer inactivity at the automated store outlet.

A receipt may be provided for the one or more items purchased. The receipt may be printed for the customer or electronically sent to the customer, such as via email or the like.

Purchase data from the automated store outlet is relayed to a central control center via a wired or wireless network. The customer may be able to request live customer service assistance while using the automated store outlet, which will be in the form of a live attendant at a remote location communicating with the customer via an audio link or an audio/visual link, such as through a display monitor of the automated store outlet. Typically, the automated store outlet is monitored with surveillance devices, which may be used in assisting the customer with customer service. The surveillance devices also provide security from theft and destruction of the automated store outlet.

In one embodiment, advertisements are displayed on a monitor associated with the automated store outlet. The advertisements may be related to the automated store outlet, the goods and items sold within the automated store outlet, or unrelated advertisements.

The current invention provides a real time video and audio communication, allowing consumers to communicate with the Automated Store Outlet's customer service in real time.

The use of this invention can be very broad and can overcome many of the limitation or the restrictions of the common kiosk or the company's micro-market as well as the limitation and restriction of typical vending machines.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

FIG. 10 is a bottom perspective view of a sensor tray used in accordance with an embodiment of the present invention;

FIG. 11 is an enlarged perspective view of area "11" of FIG. 10, showing details of the sensor tray of FIG. 10;

FIG. 12 is an enlarged perspective view of a photosensor plug in area "12" of FIG. 10;

FIG. 16 is a partially exploded and diagrammatic view of the detection of an item removed from an RFID-based sensor tray, in accordance with the present invention; and FIG. 17 is a perspective and diagrammatic view of a larger micro market system incorporating multiple check-in stations and multiple modular bays, in accordance with the present invention.

DETAILED DESCRIPTION OF THE PREFERRED EMBODIMENTS

As shown in the accompanying drawings, for purposes of illustration, the present invention is directed to a system providing unattended, automated checkout store outlets for use in distributing products and items to customers. As will be more fully described herein, each automated store outlet (ASO) is designed to be fully automated and unattended. However, the system provides interactive live solutions, allowing customers to interactively communicate with customer service agents and management via audio and/or video conferencing or chat or text chat. The present invention and its related method provide greater security than currently provided by current company's' micro-markets and greater flexibility and more product offerings than are currently offered by conventional vending machines, while the transactions are still conducted without any need for attended personnel.

Figure 1:
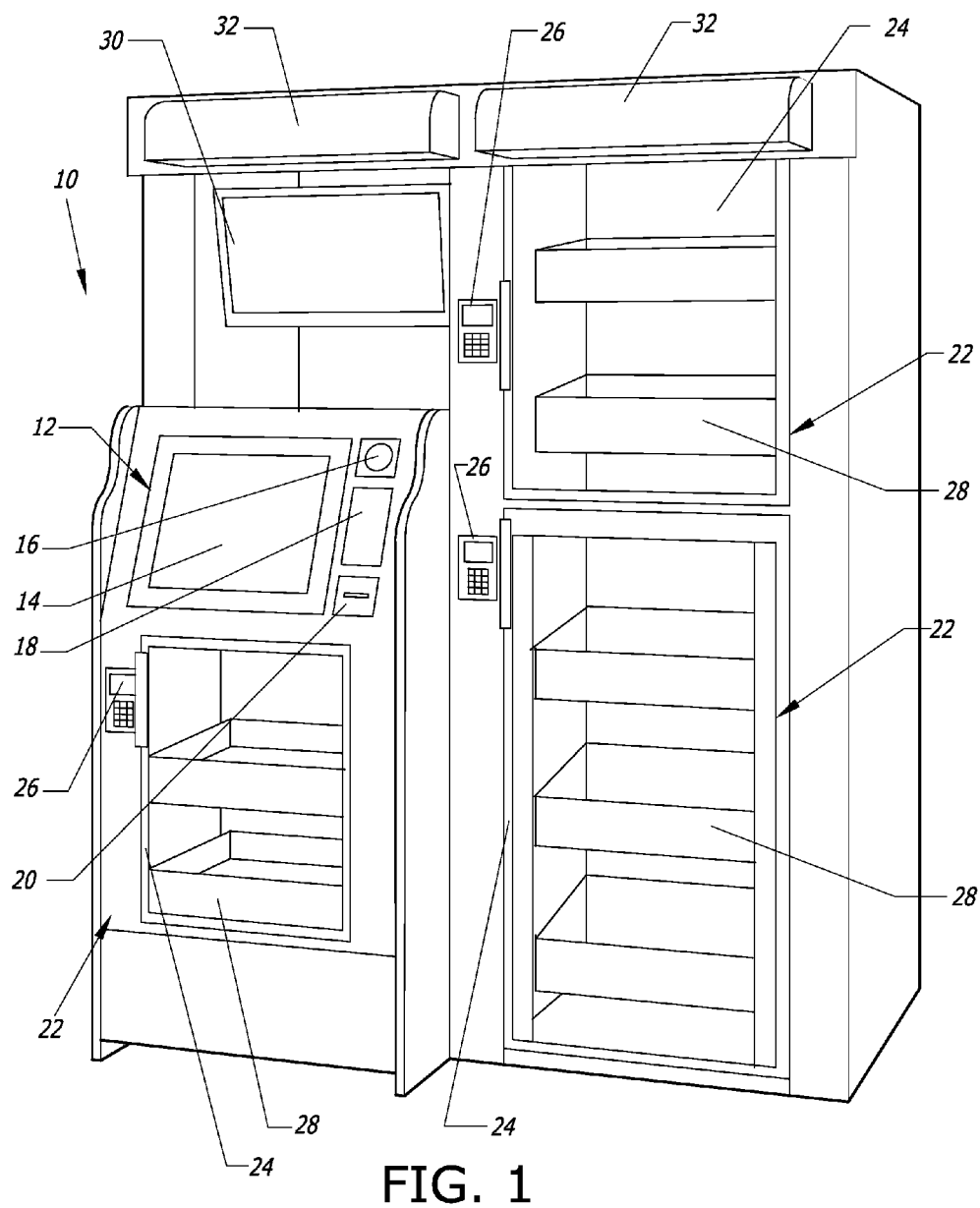
FIG. 1 is a front perspective view of an one check-in station, one bay automated store outlet embodying the present invention.

With reference now to FIG. 1, an exemplary automated checkout store outlet (ASO) 10 is shown. The ASO 10 is an unattended, automated checkout kiosk or micro store outlet. The ASO can be used for the sales of all kind of food and beverage items as well as all kind of other suitable consumer products. The ASO includes a check-in station 12 where an individual can login personal identification information, select and enter payment type and information, be approved for transactions, interface with customer service, and close transactions. The check-in station typically includes an electronic monitor or screen 14, which in a particularly preferred embodiment is a touch screen so as to both display information as well as allow the customer to interact with and input data into the system. However, it will be appreciated that other data input means such as a mouse, keyboard, etc. could be used in connection with a non-touch screen for the same purposes. The check-in station 12 also typically includes a camera 16 and speakers used for identifying the customer and/or permitting the customer to communicate live with customer service representatives or the like.

As part of using the invention, a customer is identified. This can be done in several ways. For example, the user may simply enter in a customer identification code and/or password, such as using the touch screen monitor 14. Alternatively biometric information may be obtained from the customer utilizing, for example, the camera 16 which can be used for facial recognition purposes, or a scanner 18 which can be used for obtaining fingerprints from the customer so as to properly identify the customer. Scanner 18 can also be used to read customer's RFID card or customer Quick respond imaging reading as additional options to identify the customer. A card reader 20 is typically provided as part of the check-in station 12 as well. This can be used for identifying the customer and for the customer to provide payment information, such as in the form of a pre-issued dedicated card for ASOs of the system, debit cards, credit cards, etc. The check-in station 12 can also include a mechanism for receiving deposited cash in the form of currency bills and coins in order to effectuate a transaction.

Each ASO 10 includes one or more bays 22 which contain items which are removable from the bay 22 for purchase. The bays 22 can be placed next to each other, in multiple numbers of configurations. Each bay 22 includes a normally locked door 24. Typically, the access doors 24 are comprised of glass or other transparent material such that the customers can view the contents of the bays 22 before opening the doors 24. All doors 24 are self-closing spring doors which will close automatically upon releasing the handle of the door.

In a particularly preferred embodiment, an electronic unit, such as a scanner or data input device 26 is associated with the access door 24 of each bay 22 which must be used by the customer in order to unlock the door 24 and gain access to the contents within the bay 22. Typically, this is done after becoming identified, selecting payment information, and becoming qualified through the check-in station 12. The customer may enter a code, provide a fingerprint at the scanner 26, scan or swipe a card including the scanning of a QR image, RFID card or other electronic device, etc. at the electronic unit 26 so as to gain access to each bay 22 through the locked door 24.

Figure 3:
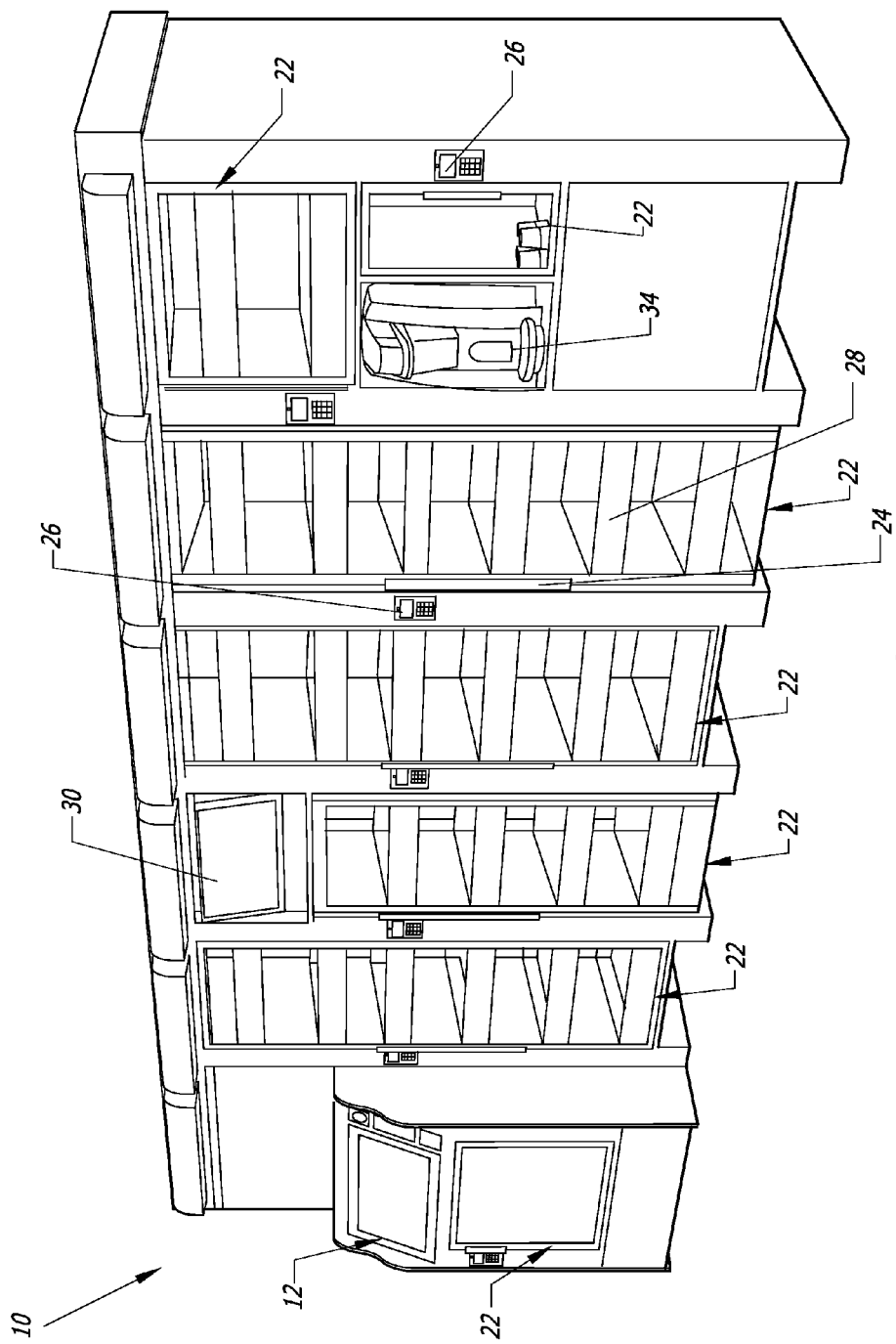
FIG. 3 is a perspective view of another automated store outlet having multiple bays, in accordance with the present invention.

As needed, the individual bays 22 may be refrigerated, be capable of holding and retaining frozen food, otherwise climate controlled, or provide no climate control, depending upon the items to be purchased therein. An ASO 10 having multiple bays 22, as illustrated in FIG. 3, may have some bays 22 which are refrigerated, while the other bays 22 are not.

Means are provided for retaining and presenting items to be purchased within the bays 22. Typically, trays 28 or other shelving is provided for these items. As will be discussed more fully herein, the ASO is able to detect the removal of every item from each bay 22 so as to charge the customer for each item removed.

With reference again to FIG. 1, the present invention contemplates the use of incorporating an advertising or marketing monitor 30, which will provide advertising and marketing for various products and services. These products and services may be related to the ASO or the company providing and servicing the ASO, or may be related to other companies. The advertising monitor 30 may also be used to advertise items for sale within the ASO. Alternatively, the advertising monitor 30 may be used to advertise goods and services which are completely unrelated to the ASO 10 or the items for purchase therein. The advertising monitor 30 could also be used for describing to new customers how to use the ASO system. This can be done either at the advertising monitor 30, at the monitor 14 associated with the check-in station 12, or printed instructions could be provided on the ASO 10.

Canopies 32 are typically attached to the modular units containing the bays 22, check-in station 12, etc. for providing lighting, branding and marketing, and otherwise making the ASO 10 unit aesthetically pleasing.

Figure 2:
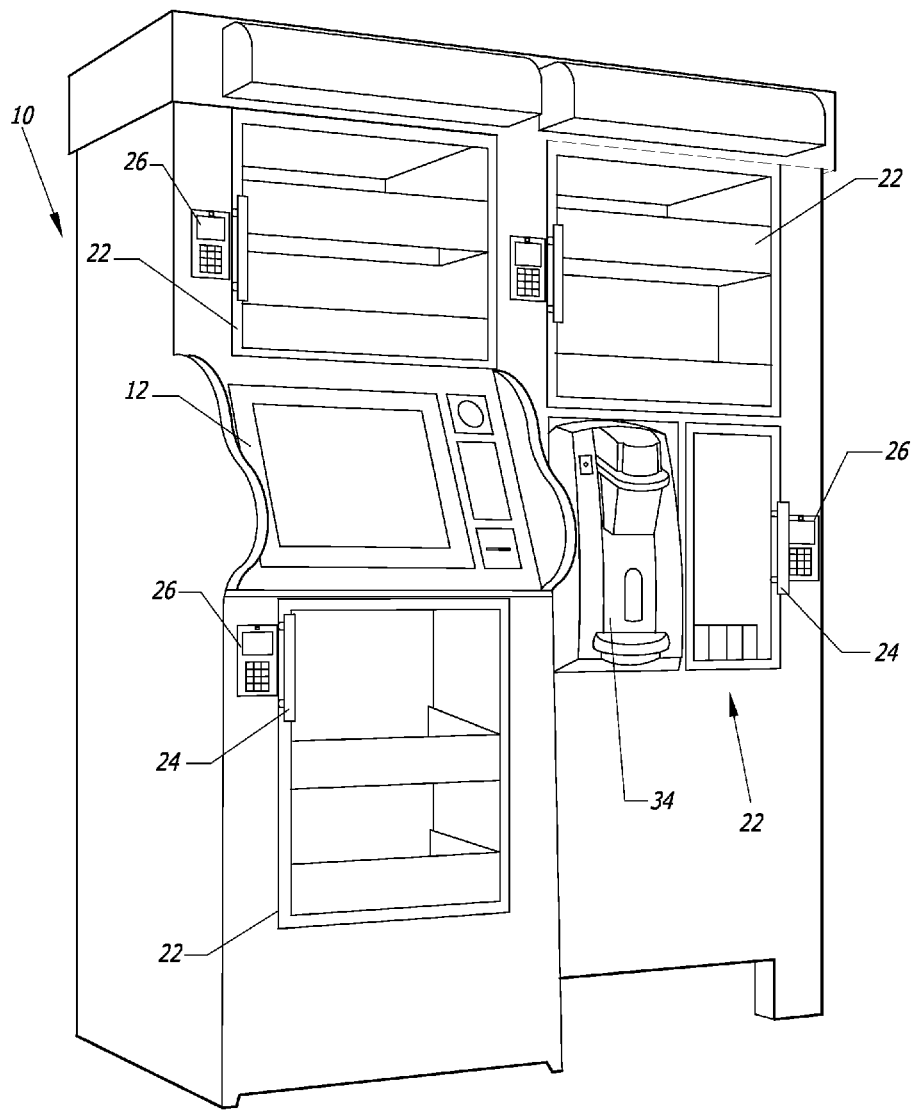
FIG. 2 is a front perspective view of another automated store outlet having a hot drink brewing dispenser embodying the present invention.

With reference now to FIG. 2, another ASO 10 is shown having a check-in station 12, as described above, and a plurality of bays 22 within two modular units. In this case, however, it will be seen that the modular bays 22 are of a different configuration and size than that illustrated in FIG. 1. Moreover, one of the bays 22 includes items related to a drink dispenser 34. The drink dispenser 34 typically comprises a coffeemaker, but can also provide hot water for making tea, cold water for making cold flavored beverages, etc. The coffee K-cups, teabags, flavoring packets, cups, etc. would be accessed through the locked door 24 of the bay 22, and after retrieving and purchasing these items, the customer could make the desired beverage using the beverage device 34. The beverage device 34 may or may not be behind a closed and locked door 24. Other type of hot or cold single cup beverage dispensers 34 may be provided. Such dispensers are controlled by the ASO's computer system and dispense selected beverages only to qualified customers.

The ASO 10 illustrated in FIG. 2 allows the operation of an automated, unattended coffeehouse. Customers are allowed to prepare their own hot or cold beverages, such as coffee or tea, independently. The brewing device 34 may be only activated after the customer has properly checked in and become qualified through the check-in station 12. The customer may also be able to purchase other products that are commonly sold in coffeehouses, such as muffins, cakes, other bakery items, etc. which can be obtained through the one or more additional bays 22.

Traditional coffeehouses, such as Starbucks and others, have become very popular and are visited frequently. However, in many cases, such coffeehouses are located a sufficient distance away from the customer that the customer must either walk several blocks to the coffeehouse or drive his or her car to the coffeehouse. Also, many times there is a long line of customers in such coffeehouses and it takes time to get service. Additionally, such coffeehouses are charging quite high prices for their products. There is a need for an automated coffeehouse kiosk or ASO embodied by the invention that can be conveniently located within lobbies, office buildings, airports, dorms, etc. which are fully automated, unattended, and provide quality coffee, tea, etc. at lower prices.

With reference now to FIG. 3, the ASO 10 of the present invention is modular and multiple bays 22 can be provided in varying configurations as part of the same ASO 10, and a single check-in station 12, as illustrated in FIG. 3. Thus, for example, in larger buildings, airports, etc. where there is a greater need and sufficient space, a larger ASO having multiple bays 22 can be provided. However, in smaller buildings, dormitories, and the like a smaller ASO, such as that illustrated in FIG. 1 or 2 can be provided to meet the needs of that location. The ASO modular is very flexible allowing designing ASO in deferent shapes and configurations. Therefore, ASO may be as small as illustrated in FIG. 1 or bigger as illustrated in FIG. 3 or in any other size based on the location's requirements and the location physical configurations. The ASO 10 operates in the same fashion, regardless of the number of bays 22 and modular units provided.

Figure 6:
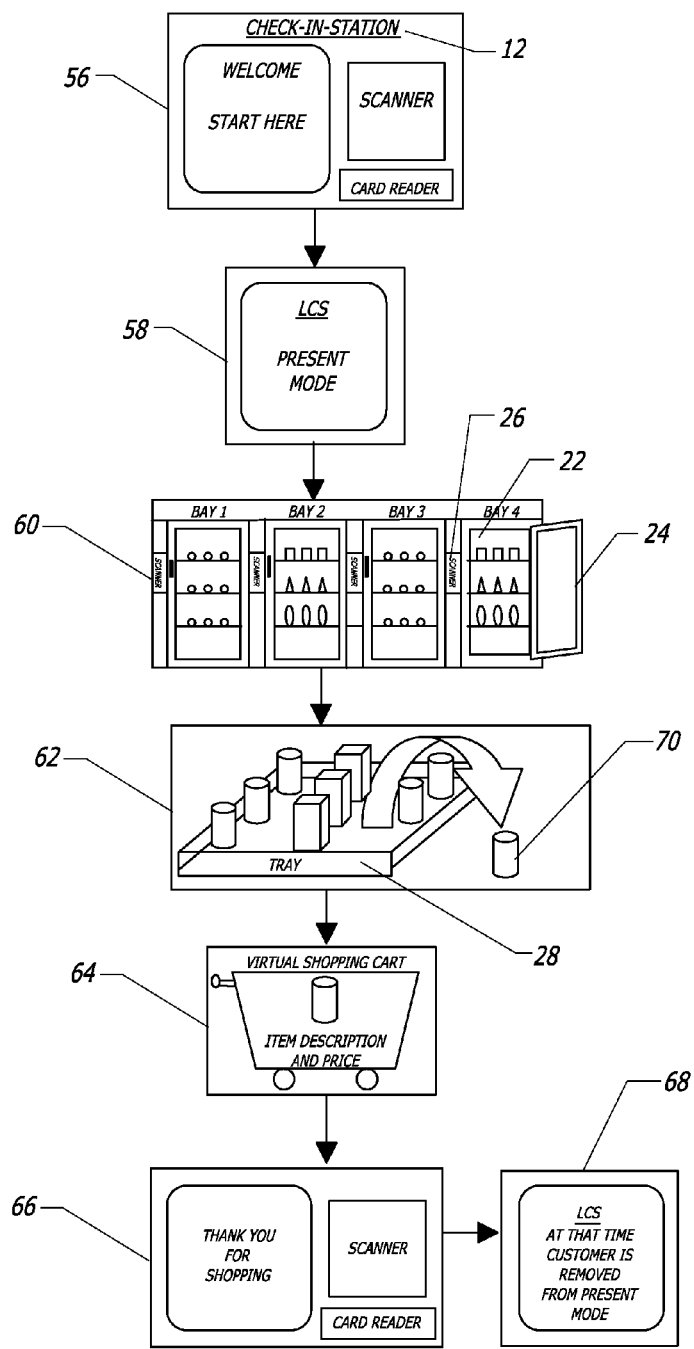
FIG. 6 is a diagrammatic view illustrating the operation and use of the present invention.
Figure 7:
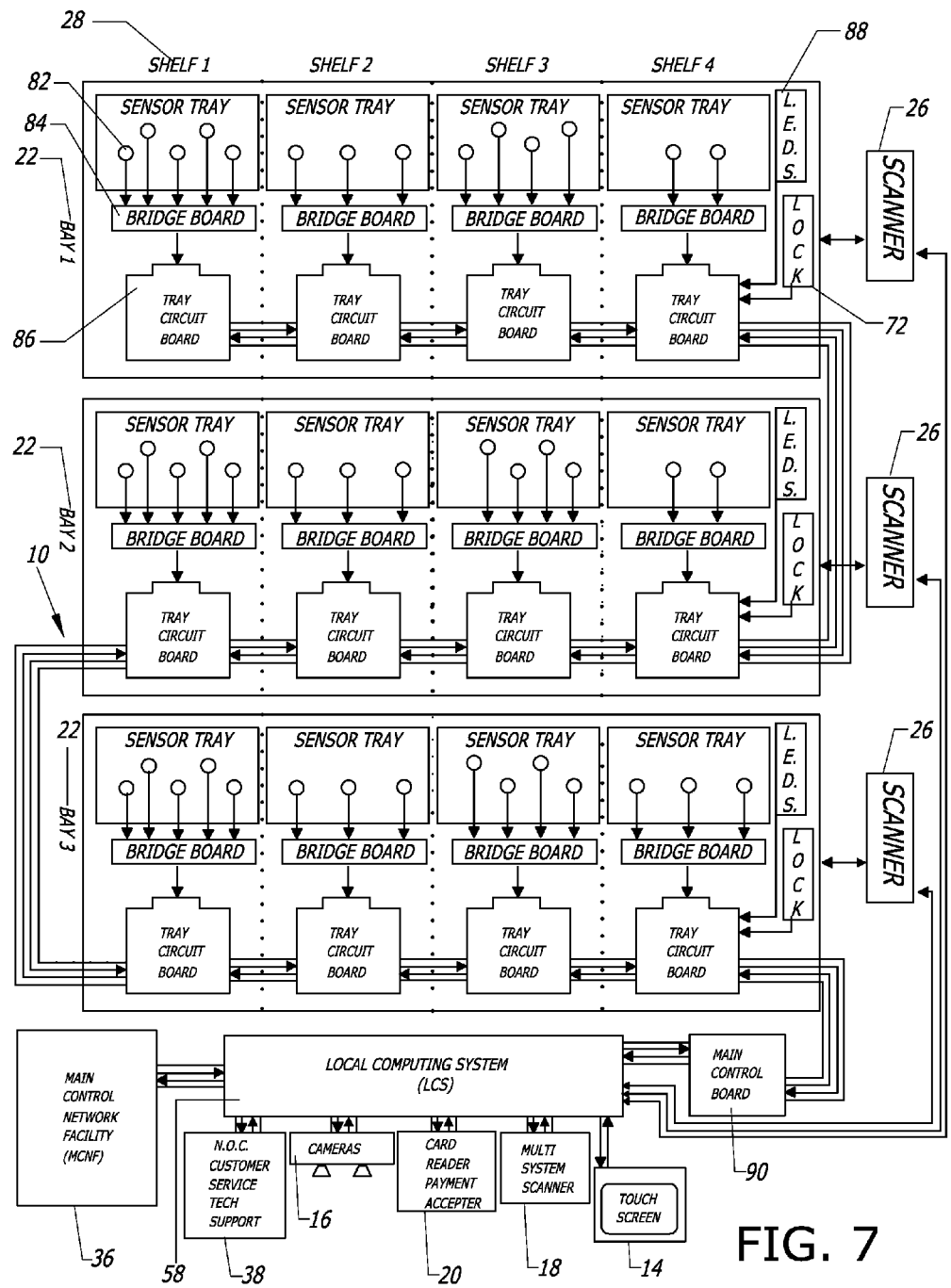
FIG. 7 is a diagrammatic view illustrating various components of a typical automated store outlet of the present invention.

As is illustrated in FIGS. 6 and 7, each of the bays 22 is able to detect the removal of an item therefrom by the customer who has gained access to the bay 22 through the electronic identification unit 26 associated with the lock of the door 24. This information is relayed from circuitry associated with each bay 22 to a main controller and local computing system (LCS) at each ASO for determining the exact identity of each item removed by that particular customer and charging that particular customer for the items removed. The main controller and LCS also control the functions of the check-in station 12. Thus, all functions of each ASO 10 are fully operated by the LCS located locally at each ASO. The LCS creates, saves and maintains activity reports and history logs at each local ASO. Thus, in the event of communication and network outages, the ASOs of the present invention can still operate and function as they are self-sufficient by containing the necessary circuitry, controllers, computers, software, etc. to perform transactions.

Figure 4:
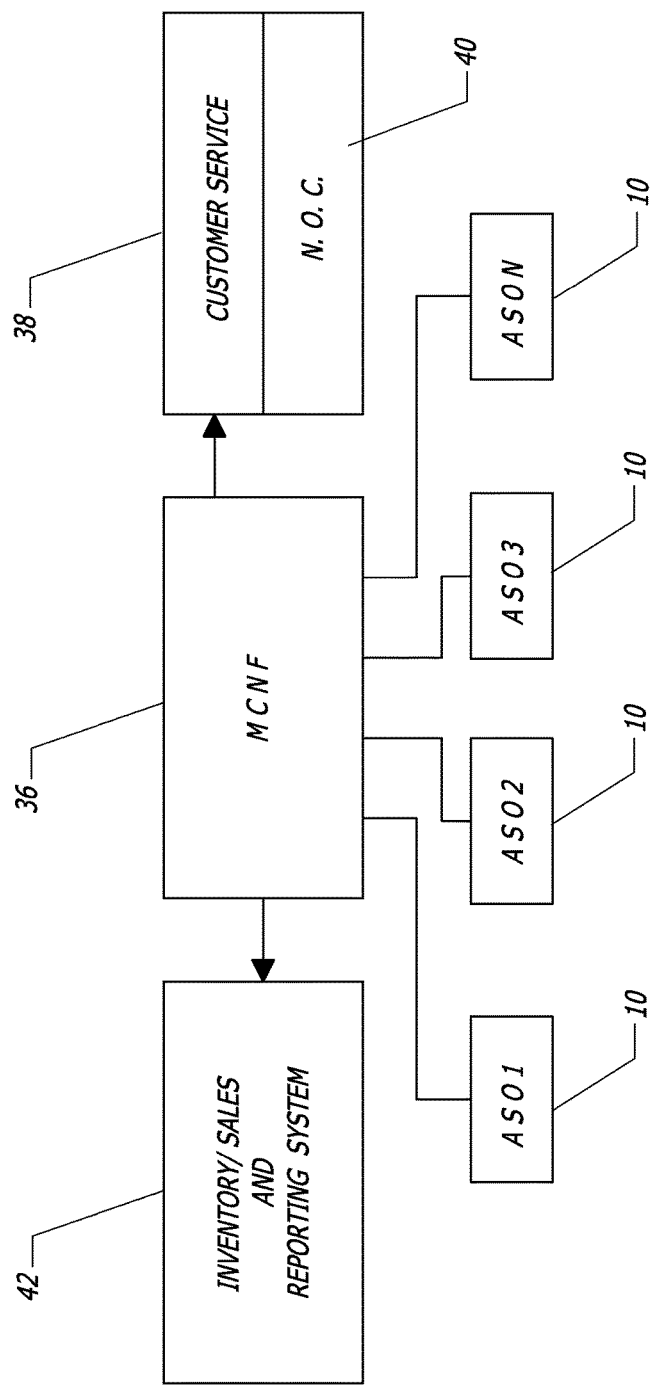
FIG. 4 is a diagrammatic view illustrating various aspects of the system of the present invention.

With reference now to FIG. 4, however, each ASO 10 (labeled ASO1-ASON) are typically in constant communication with a central control center or main control network facility (MCNF) 36 to exchange data, information and activities. The MCNF 36 assists in the activities of all ASOs, as well as the customer service network 38, the network operation center (NOC) 40 and inventory, sales and a reporting system 42. The customer service network 38 allows customers to interface live with customer service staff. The network operation center is typically tied to the company's website and allows customers to create accounts, add funds to their accounts, obtain company news, review personal activity records and/or statements, and other such related functions. Thus, a two-way communication network is established, using wired or wireless technologies, for the ASOs to relay information to the MCNF 36, NOC 40, customer service 38, or the inventory and sales and reporting system 42, and receive communication back in the form of customer service, surveillance, remote operation, etc. However, in the event of a network outage, as described above, each ASO is capable of performing transactions and recording such transactions for later forwarding to the MCNF 36, or other applicable unit or department.

It is contemplated by the present invention that either via a website or a check-in station 12 at an ASO 10, a customer creates an account dedicated to the system of the invention. Funds are loaded onto the account and a dedicated card or electronic device may be issued to the customer. Alternatively, the customer may be provided a customer identification, PIN, password, etc. to enter in at the check-in station and/or electronic scanner units 26 to gain access to the ASO to make purchases, etc. The funds of the dedicated account may be replenished by means of debit cards, credit cards, wire transfers from bank accounts, or even cash deposited into the ASO.

Figure 5:
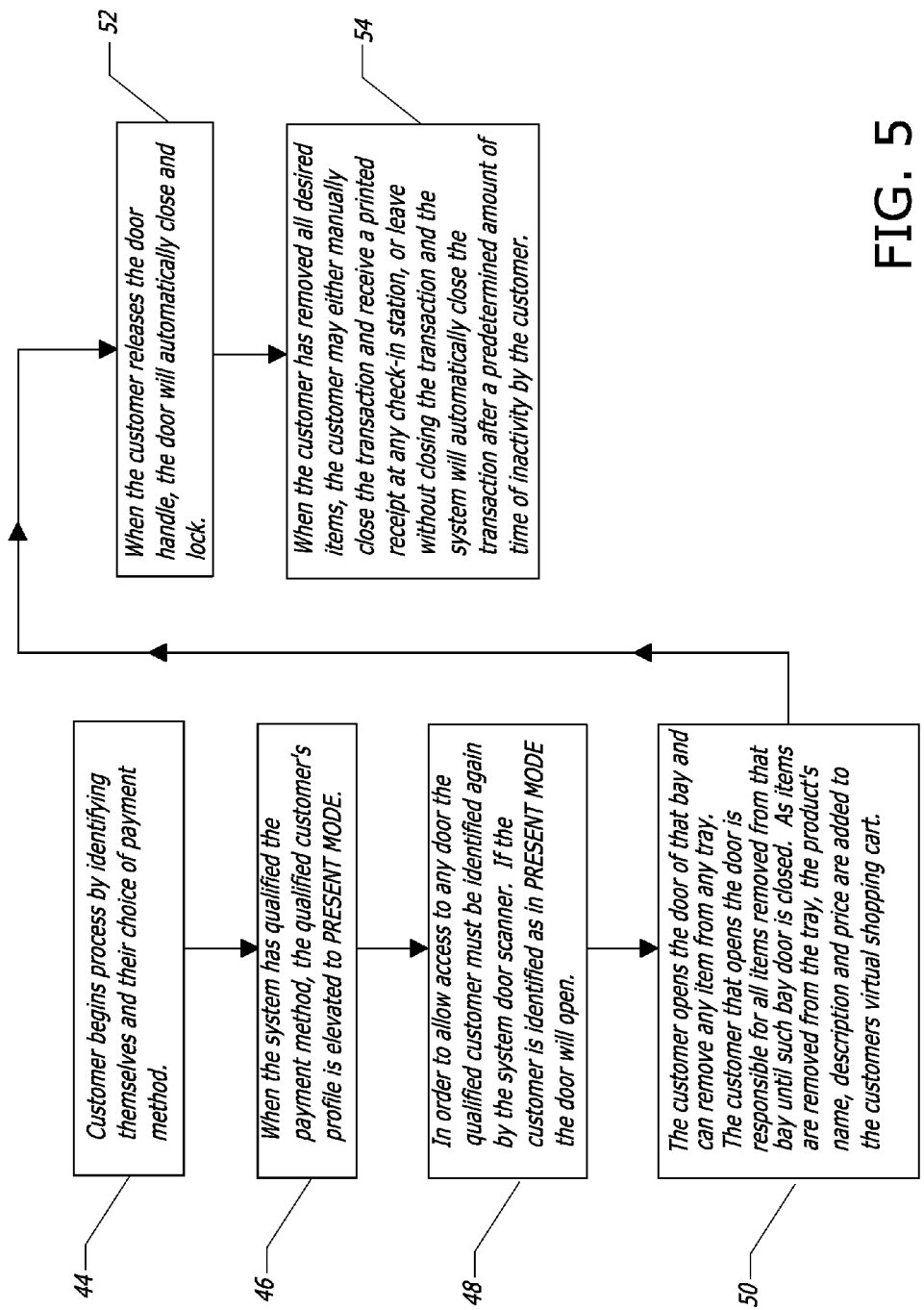
FIG. 5 is a flowchart depicting steps taken in accordance with the present invention.

With reference now to FIGS. 5 and 6, a customer begins the process of using the present invention by identifying themselves and their choice of payment method 44. This is typically done at the check-in station 12, as illustrated in step 56 of FIG. 6.

The first step that a customer takes when the customer reaches the ASO 10 is to go through an identification and qualification process. During this process, the local computerized system identifies the customer and then qualifies the customer to shop at the ASO. A customer can be a member or a non-member. A member is a person who preregistered with the company and has a customized member card or identification code or the like which was issued to him or her by the company.

As mentioned above, the initial identification is usually accomplished at the check-in station. If the customer is an approved member, the customer will have with him or her his or her own customized member card (such as an RFID card, an NFC card, magnetic strip card, or other type of customized identification smart card). The customer will also typically have a personal identification number (PIN) which is already pre-associated with the member card. The customer scans his member card onto the scanner or card reader at the check-in station 12 and then enters his own PIN using the station's keypad or the station's touch screen. In some cases, the customer may be required to enter additional information such as a zip code, date of birth, the name of his or her pet or other information that may be saved in connection with the customer's profile for security purposes.

The present invention contemplates replenishing the issued member payment card with credits representing dollar amounts either online on the company website, or at the check-in station screen at any ASO using a credit or debit card or currency. Members may also authorize an ACH transaction to replenish their payment card.

Alternatively, if the customer is a member who previously scanned and registered his or her facial and/or fingerprint imaging, the customer can also be identified by the biometric data such as by scanning his or her face or fingerprint at the check-in station scanner. The system compares the facial, fingerprint, or other biometric image with the biometric images on record and identifies the customer.

As another option, the member customer may enter his or her user's name and password or the like, using the local check-in station's touch screen or other data entry mechanism. The system compares the information with the database, and if the system finds the information entered matches the database records, the system completes the identification process. Once again, in some cases, the customer may be required to enter additional information saved with the customer's profile for security purposes.

As yet another option, a member customer may download a company software application onto a mobile electronic device, such as a smart phone, which allows the customer to be identified by using an image, such as a QR code, downloaded to the customer's mobile device. Upon accessing the application from the mobile phone and after entering the customer's PIN and requesting the QR image, the QR image is pushed to the customer's smart phone number. A new QR gets pushed to the customer's smart phone each time the customer accesses the application and requests an image. The smart phone number on file and the customer's PIN must match in order to receive the qualified QR image. The particular image is good for one session in the ASO. If the image does not get used for a predetermined length of time, the image becomes void.

Additionally, by using this option, the customer gets his or her active virtual shopping cart, in real time, during any shopping session in the ASO directly on the mobile phone display. Also, from time to time, the customer gets notices and promotional advertisements that are pushed to the customer's smart phone, using push notification functions or any other cellular technology.

If the customer is not a member and wishes to shop at the ASO using a credit or debit card, the customer can scan the card with the reader at the check-in station 12. The customer may also be required to enter additional information such as a billing zip code, date of birth, or any other information that may associate the person with the payment credit or debit card. Additionally, the customer may also be required to be scanned biometrically, such as providing a facial image from the check-in station's camera and/or a fingerprint.

If the customer wishes to use cash for a shopping session, the customer must enter the cash bills or coins into a cash acceptance receiving machine that is part of the ASO, such as part of the check-in station or as a separate bay beside the check-in station. In one embodiment, the customer will enter his or her name, driver's license, be scanned biometrically, and/or be provided a PIN or other identifying information.

In one embodiment, the machine will issue on location at the ASO a card that is loaded with the funds in the same amount that the customer fed into the machine, so long as the amount is over a minimum amount required. Alternatively, the machine may print a customized QR image, barcode, RFID tag card, or other image on a smart paper access card which is issued specifically for such transaction. In yet another alternative, a temporary access PIN may be provided to the customer, either instead of such printed image or smart card or in addition to these. The PIN may be generated by the machine or selected by the customer on the cash machine's touch screen. The access cards, printed image, and/or PIN will allow the customer to access bay doors 24 and shop at the ASO.

Upon completing the current shopping session, the customer may insert or scan the temporary access card back into the machine to redeem cash in the amount of the remaining balance on the card (the remaining balance being the amount loaded onto the card less the cost of the items purchased during the shopping session) or keep the card for future use. Additionally, such types of cash access cards with preloaded specific dollar amounts may be offered for sale as gift cards or cash access cards for shopping at any ASO.

In the event that the system detects that any person may not meet certain security criteria, the system may require additional information or may deny access to such person.

After being properly identified and presenting an acceptable choice of payment, both of which are verified by the system, the system then qualifies the customer to remove items from any bay by determining that the customer payment information is of a sufficient level to purchase items from the ASO. The qualification process is necessary in order to confirm that the customer's account has sufficient funds available for an average shopping visit amount. The amount of an average shopping visit may be different in each location and can be preset on the system. Thus, after the identification process is completed, the system prequalifies the customer's member card or account, debit or credit card, or input cash for the average shopping visit amount. If the payment amount is not qualified, the system notifies the customer on the check-in station screen that there is not a sufficient amount in connection with the payment type selected in order to conduct shopping. Alternatively, the system may allow the customer to specify on the touch screen a lower qualification shopping amount based on the customer's intention to spend at this visit. If the unqualified customer is a member, the member customer may add funds to his or her account using a debit or credit card, ACH transfer, etc. to become qualified. If the customer is not a member, the customer may use a different debit or credit card that will be qualified or insert additional cash into the ASO. Otherwise, his or her access will be denied.

With reference again to FIG. 5, when the system has qualified the payment method, the qualified customer's profile is elevated to PRESENT MODE 46. With reference to FIG. 6, this is done by the local computer system 58.

Present mode means that the customer and his or her card or other payment information passed the identification and the qualification process and that he or she is present at the ASO and is qualified to open the bays' doors and shop at the outlet store. The customer's profile in the present mode includes the customer's personal information including the customer user name and PIN, the customer's RFID/NFC or magnetic swipe card information and PIN number, and also the customer biometric information and images on record, such as fingerprint and facial scanned images or other available and pertinent personal identification information.

In the event that the cash system issues a temporary access cash card, barcode or QR image access card, or the like, the system approves the card for shopping and elevates the card's credentials to present mode.

Figure 8:
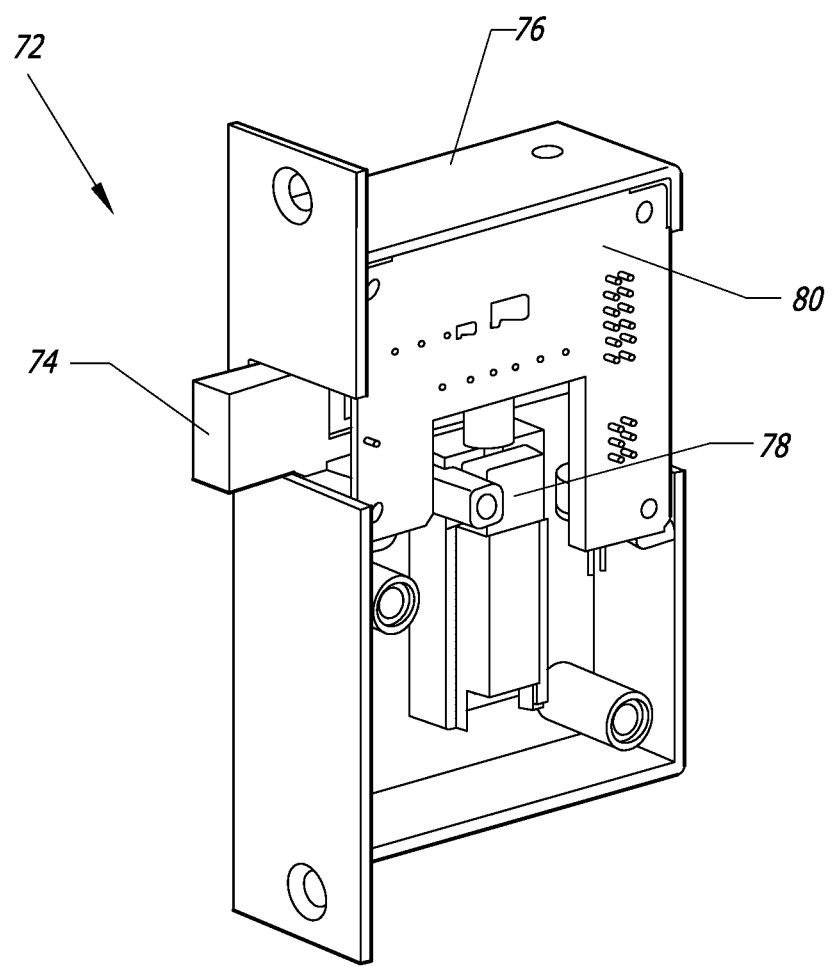
FIG. 8 is a perspective view of an exemplary locking mechanism used in accordance with the present invention.

In one embodiment of the invention, under this option when in the present mode, the doors to the one or more bays are either unlocked or can be selectively unlocked, such as by only depressing a button, switch, etc. associated with the door 24 and the lock illustrated in FIG. 8, and without the requirement of a second identity scanning by the door's scanner 26. However, this option may only be available in a very small ASO which enables a single customer to utilize the ASO at a given time. In such case of a relatively small ASO 10 having only a single bay 22, this is not a concern and this option may be suitable. However, this option presents a problem in ASO with multiple bays 22. If only one customer will be able to shop at such larger ASO at any given time, an unqualified individual other than the qualified customer can open a door 24 and access items within a bay 22 that will be wrongly charged to the customer who is in the present mode.

Accordingly, in a particularly preferred embodiment, in order to allow simultaneous access by multiple customers to shop and open multiple larger ASO's door 24, each qualified customer must be identified again before opening any bay door 24 by the electronic unit or scanner 26 associated with each bay door 24. If the customer is identified as in the present mode and the proper identification is presented at the scanner 26, the door will open 48. Otherwise, it remains locked. Nevertheless, one customer can open one door at a time. Such customer is the responsible party for all removed item from such bay 22 until such bay's door 24 is closed and locked.

Only a customer that has his profile or his cash access card in the present mode can open a bay's door to remove products. In order to open any door, the customer must scan his or her card, facial or fingerprint or other biometric information, or enter his PIN into the door scanner 26 located by each door 24, as illustrated in step 60 of FIG. 6. Such door scanners and their components are multi-system scanners which can perform an RFID/NFC scanning, barcode or QR code image reading, biometric facial or fingerprint scanning, or a manual entry of user name and PIN. The electronic scanner unit 26 of the present invention can accept any one of these methods or any combination thereof, or any other identification means. For example, customers that use their credit or debit cards to qualify may enter manually into the scanner unit the last four digits of the card that was used during the identification and qualification process, or enter a PIN that may be given to him/her during the identification and qualification process, or use a printed barcode or QR access card issued by the ASO to the customer during the check-in process. If the customer's credit or debit card is a smart card, the scanner may read the RFID, NFC or other identification technology as the customer scans that particular card onto each door's scanner to open any bay's door. As an additional security measure, the ASO may require the use of biometric facial, fingerprinting, or other imaging in addition to any of the foregoing. A customer's card or profile that is not in the present mode will not be able to gain access to open any bay's door.

Instead of issuing member cards, other electronic devices in the form of bracelets, rings, etc. which contain a smart RFID chip or any other RF technology may be issued to the customer. By wearing such bracelets or rings, etc. the customer member can merely hold any bay's door handle and open the bay's door. By holding the door's handle, the door's scanner that is located near the door's handle, within a few inches, will detect the customer's identification within the bracelet or the ring and allows the opening of the door.

After the computer system confirms that the information entered into the door scanner matches the information of the customer's profile that is in the present mode level, the computerized controller unlocks the particular bay's door.

Alternatively, instead of the main controller or LCS performing such function, the present mode information can be downloaded and updated in real time to all door scanners with all profiles of customers and access cards which are elevated to present mode such that the information can be temporarily stored in the memory of each scanner for as long as the customer's or card's profiles exist in the present mode. Thus, when the customer scans his or her card, provides biometric information, enters his or her PIN into the door scanner located by each door, the scanner obtains a match with the customer's profile identification information saved on the scanner's memory, and the scanner notifies the central controller and LCS of such a match and requests that the LCS unlock the door.

In this manner, only one person at a time can open a door 24 of a given bay 22. As such, that customer is the responsible party for all items that are removed from the bay as a result of him opening the door, while allowing multiple customers to shop at the ASO simultaneously. Having customers go through an identification and qualification process and be elevated to present mode also facilitates the second identification step at the electronic device scanner associated with each bay door. Instead of the system having to search a database for the identification code, password, fingerprint, etc. of all the members which belong to the ASO system, the local computer system of the ASO can merely search for the assigned and known identification codes, passwords, biometric information, etc. for those customers who are already in the present mode and currently present and shopping at the ASO. This cross-matching and determination can happen nearly instantaneously, whereas searching a large database of such information can take additional time.

In one embodiment, upon identifying the customer and opening the lock of that bay's door, a display screen of the electronic unit scanner 26 may display the customer's remaining balance and the customer's current virtual shopping cart. When the door closes, and is locked the screen clears again waiting in standby for the next customer to enter an ID and be authorized before presenting such information to that customer.

If a customer does not have sufficient funds in his account or if the customer's shopping amount exceeds the amount that the card was qualified for during the check-in process, a message will be provided to the customer, such as on the scanner's display, notifying the customer that he has exceeded his authorized shopping amount and the door will not unlock. Customer service may be notified and be able to intervene via a video or audio connection. The customer will be allowed to provide a different payment option or supplement the existing payment option in order to continue to shop at the ASO.

With reference again to FIGS. 5 and 6, the customer that gains access to the door and opens the door to that bay can remove any item from the bay trays. The customer that opens the door is responsible for all items removed from that bay until the door is closed and locked. As items are removed from the bay, the product's name, description and price are added to the customer's virtual shopping cart 50. This is illustrated in steps 62 and 64 of FIG. 6. As the customer removes an item 70 from the tray 28, sensors detect the removal of the item 70 and the system is able to determine exactly the product name, description and price of that removed item 70 so as to add it to the virtual shopping cart 64. As described above, the virtual shopping cart may also be provided on the user's mobile electronic device, such as a smart phone, display screen, as well as on a screen associated with the electronic unit scanner 26, and/or the display screen 14 associated with the check-in station 12. This may be automatically displayed, or only displayed if requested by the customer.

Thus, as the customer removes an item 70 from the tray 28 of the bay 22, the system detects, in real time, which product was removed and logs such product as a "pending sale item" in the virtual shopping cart of the identified customer that opened that door. The system detects the removal and identifies the products that get removed based on the preconfigured database information of each compartment of the tray. Detection of the removal of products can be accomplished by using any optical or electrical sensor system or any digital measurement system and/or by using any RFID or NFC identifying tag system as well as any other suitable sensor technology.

If the customer returns the item 70 to the tray 28, the system in real time removes that item from the customer's virtual shopping cart. In some cases, if the customer wishes to return the item to the tray before closing the door, the customer must return the item to the same location that the item was removed from. If the customer does not return the item to the right location, credit may not be issued for such return and an alarm and/or voice announcement will request the customer to move the item to the correct location. The misplaced item will be logged and if not corrected by the customer, such compartment's product may be automatically updated by the software. If the software is unable to update the database, the software issues a notice to the maintenance crew indicating such misplaced product. In the use of some sensors, such as RFID tags or the like, the location of each product is less critical and such functions are modified accordingly based on the situation of each occurrence.

With reference again to FIG. 5, when the customer releases the door handle, the door will automatically close and lock 52. In a particularly preferred embodiment, the glass door 24 in front of each modular bay 22 is a biased, self-closing spring door which will close automatically upon releasing the handle of the door. When the door is fully closed, the locking mechanism detects that the door is completely closed, and then at that time the system activates the electric deadbolt to lock the door.

With reference now to FIG. 8, such an electronically actuated deadbolt lock 72 is shown. A deadbolt 74 is selectively moved from an open to a closed and locked position as dictated by electrical current, electrically generated signals, etc.

In one embodiment, the door includes a metal magnetic strike plate designed to accommodate the deadbolt 74 of the electrical locking mechanism 72, as well as to activate a reed switch in the lock when the door is fully closed. The electrical locking mechanism 72 as illustrated in FIG. 8 may include a unit case 86, the deadbolt 74, motor and gears 78 for moving the deadbolt 74, and circuitry 80, including any limit switches, magnetic reed switches, etc. for detecting the closing of the door, receiving signals from a computerized controller, etc. Typically, limit switches, reed switches or the like detect the position of the door at all times. The magnet on the strike plate is positioned to activate the reed switch when the door is fully closed, and at that time the control board activates the motor to slide the deadbolt and lock the door. The locking or unlocking of the bays' doors is typically based on commands from the main central control board 90.

If the customer wishes to open the same door, the customer must repeat the above-indicated steps. That is, the customer must scan his or her card, electronic device, provide a biometric scan, enter a proper code, etc. while in the present mode. Once again, the central control board or LCS activates the motor and gears 78 and pulls back the deadlock 74 so as to unlock the door and allow the customer to open the door and remove items from the bay 22.

With reference to FIG. 5, when the customer has removed all desired items and is finished shopping, the customer may either manually close the transaction and receive a printed receipt at the check-in station, or leave without closing the transaction and the system will automatically close the transaction after a predetermined amount of time of inactivity by the customer 54. As illustrated in FIG. 6, the customer may return to the check-in station and present identification to view the virtual shopping cart and close the transaction and obtain a printed receipt, if desired. Upon scanning the customer's ID card, or providing other identification, the system displays the particular customer's virtual shopping cart which lists all the items that the customer has removed from the trays. The customer may review this list and then click okay to complete the transaction. However, if the customer wishes to not spend time to close a transaction, the customer may simply walk away from the ASO and after the system detects that the customer is no longer active within the ASO for a predetermined period of time, the system closes the particular shopping session automatically, and charges the customer for the items removed and shown in the virtual shopping cart. Instead of a printed receipt, a receipt may be sent electronically to the customer, such as via email, text, etc. This is particularly desirable for the customer who elects not to manually close the transaction at the check-in station 66. After the transaction is closed, the software and LCS computer system removes the customer from the present mode 68.

As indicated above, the method of requiring a second identification and verification at each door of each bay allows multiple numbers of customers to shop at the ASO simultaneously. The system, in real time, differentiates between each customer's virtual shopping carts based upon the customer's access to a given bay and the removal of given items within that bay, and accurately charges each one of the customers for the products that each customer removes from each tray after opening the bay's door. The purchase data from the ASO is relayed to a central control center, such as the MCNF 36 illustrated and described above in FIG. 4.

Also, as mentioned above, in small ASOs, when only one person can shop at a time, the door scanner electronic units may not be required. In such situation, the identified and qualified customer is assumed to be the only person that opened a door during the one person shopping session and that the customer has removed items from the one or more bays. Thus, the identified and qualified person is the responsible party for all products removed from any tray and bay during the shopping session.

In such case, the shopper may be required to unlock a given bay door by depressing a button, such as a lit green button. The other doors will remain locked to prevent third parties from opening the doors and removing items from other bays. Thus, only one door can be open at any given time for security purposes. If there is only one bay with one door, such may not be necessary and the door will be unlocked for the customer immediately upon becoming identified and qualified.

In such case, in order to prevent more than one customer attempting to log in at a given time and/or to force the customer to manually close a transaction, a motorized card reader might be used to hold the customer's member card, credit card, or debit card until the shopping session is completed and the customer closes the transaction manually using the check-in station's touch screen and the customer's account is charged. This will require that the customer manually close the transaction by viewing the virtual shopping cart and approving the transaction. After the transaction is closed and the customer's account billed, the motorized card reader releases the customer's card and the system shifts to standby mode ready for the next customer. In the event that the customer uses biometric scanning, an RFID or other swipeable card, the customer merely closes the transaction by pressing the okay or other such indicating button at the check-in station's touch screen and after charging the customer's account, the system will shift to standby mode ready for the next customer. A printed receipt or an electronically emailed receipt will be provided to the customer.

With reference now to FIG. 7, a schematic diagram is shown illustrating the interconnection of the various components of a typical ASO 10. Three bays are shown for purposes of explanation and illustration. Each bay is shown with four shelves or trays 28. Each bay 22 is shown with the corresponding electronic scanner unit 26, lock 72, and LED lights 88.

The check-in station 12 components of a display screen 14, camera 16, scanner 18 and/or card reader payment accepter 20 is shown communicating with the local computing system (LCS) 58. The LCS 58 communicates with the MCNF 36, NOC, customer service tech support unit 38, etc. However, as discussed above, all of the functions of the ASO, other than remote surveillance and customer service, are typically performed locally at the ASO 10 to prevent the ASO from not being able to function and perform transactions in the event of network disruptions, which would otherwise occur if the system were based on a cloud or remote computing system. Moreover, in order to ensure the ability to service customers efficiently in order to have the fastest function responses at all times and in order to avoid down time due to Internet interferences and outages, the ASO computing system's LCS is locally placed, instead of a cloud or remote computing system. Therefore, the ASO 10 can remain in operation during Internet outages. The LCS conducts multiple functionalities simultaneously in the operation of the ASO, which includes identification and qualification of customers, the operation of the locking mechanisms and detection of removed items, applying charges, surveillance video, as well as all other customer interactive media functions such as video2 and audio live conferencing. Therefore, the LCS 58 consists of a suitable high grade one or more computing system to accommodate such functionalities locally, without delays, and the outages or interferences that may occur by using cloud or other remote computing systems.

Each shelf or tray 28 includes a sensor tray 82 containing one or more sensors which detect when an item is removed from the shelf or tray 28. This is relayed, typically via a bridge board 84 to a local tray circuit board 86 and then further, to a main circuit board 90 which directly interfaces, or is even part of, the LCS 58. The tray circuit boards 86 may be interconnected in series, as illustrated, or may all be directly connected to the main control board 90 and LCS 58. However, given the arrangement illustrated in FIG. 7, if a single sensor tray, bridge board, tray circuit board or the like malfunctions, this malfunction does not affect the operation of the remaining trays or shelves 28, and particularly the other bays of the ASO 10.

Every ASO's electrical functionalities are controlled by the main control board 90 and the tray circuit boards 86, together communicate with a proprietary software program operated by the LCS 58. Upon detecting any changes, such as removal or placement of products on or off the trays 28, a signal is generated, reporting, by a serial data string, such activity to the main control board 90. The center or main control board 90 communicates with the LCS 58 which utilizes a local database to determine which item was removed from or placed on and applies such activity to the proper present customer's virtual shopping cart.

Additionally, the main control board 90 and the tray circuit boards 86 activate the bright mode LED lights 88 and 130 whenever the system shifts to purchase mode or when any bay's door is opened. The LED light may dim when the bay's door is closed. Also, the main control board 90 controls the locking mechanism's open and close position.

In addition to the above, the invention and its software provide an extensive inventory control program and replenishment/fulfillment program. This allows the operator of the ASO to have, in real time, a full reading of all products that are present in each one of the trays or shelves 28, and to generate a replenishment list for each ASO, as needed. Upon entering a restocking mode, the system generates an inventory file, indicating the inventory of all items that currently exist in each compartment throughout the ASO. At that time, all locks or the locks of such particular portion of the ASO are open for restocking. Upon resetting, the system provides a complete reading of all trays' compartments again and creates a file showing the changes before and after the restocking session. The file can be used to confirm that restocking was done accurately. After resetting, the system changes back to standby or purchase mode.

The software manages the entire operation of the ASO including all administration activity and reports. All activities are reported, via a network connection such as the Internet, to the main control network facility (MCNF) 36. Additionally, the software operates the NOC and customer service interfaces 38. Such interfaces include the interactive features allowing the customer to communicate live through audio and video conferencing with the company's customer service or the network operating center. By touching the proper area on the touch screen monitor 14, a customer can initiate an audio and video conference call with customer service. Customer service agents appear live on the screen and help customers' needs. Additionally, the software allows the customer service representative to remotely lock or unlock doors, turn on or off the LED lights, charge or credit a customer's account, add funds to a customer's account when the customer wishes to replenish their account balance, etc. Furthermore, customer service has access to the remote viewing function allowing customer service to view the ASO sight remotely such as via the camera 16 or a surveillance system.

Each ASO is equipped with surveillance video cameras. All video sessions are stored on the local computer and can be viewed locally or remotely. If any bay's door is opened without the proper command from the main control board 90, a security alarm is activated and customer service remote viewing is turned on. All customers' activities are fully logged in or saved. In the event that any tampering is discovered, management can view the activities log and the video recording to determine who tampered with the system. Thus, such a system can also be used to confirm a customer's removal of items from the ASO.

In one embodiment of the present invention, the ASO 10 includes a motion detector. The motion detector may be part of the identification scanner 26, or may be independent and placed at one or more locations throughout the ASO. The motion detector will detect motion of someone approaching or passing by the ASO. In this case, the detection of motion by the motion detector can be used to power on the lights of the ASO, such as the LED lights 88 within the various bays 22, turn on an initial prompt screen at the screen 14 of the check-in station 12, activate the advertising monitor 30, and the like. Moreover, the detection of motion by the motion detector can be used to activate the surveillance video cameras and systems, and actuate live remote viewing for security purposes or even customer service purposes.

All doors are closed and locked until such time that a present qualified customer opens any bay's door. A qualified customer can only open one door at a time. Such customer is the responsible party for all items that get removed out of the bay during that time until the door is closed and locked. If any mechanical malfunction or tampering restricts the door from fully closing for more than a predetermined length of time, an alarm will be activated and customer service remote viewing turned on and activated.

Moreover, if qualified customers remove from the trays or shelf 28 items that the combined cost exceeds the amount that the customer is qualified for, the customer profile will be removed from the present mode restricting the customer from opening any additional doors and the local door alarm will activate as well as a video and/or audio session will be activated allowing customer service agents to request the customer to return the excessive items until the customer balance is sufficient to purchase such items. Additional security measures may be applied as needed.

The MCNF 36 is a central control center that manages all ASO locations as well as the company's administration and reporting needs. The MCNF hosts the company's Network Operating Center, the company's customer service and the company's websites. The MCNF communicates with each ASO's LCS 58 via the network connection, exchanges data and assists in the operation of each ASO. However, all local functions, mechanical and electrical, as well as all detection identification and qualification of each customer are mainly controlled by the local LCS of each ASO. However, the MCNF can utilize the software to manage the company's administration including all sales reports and inventory, restocking reports, customers' account activities and balances, member database and a variety of other functions and special programs. Additionally, the MCNF hosts and manages the company's websites which provide company information as well as allowing members to log on to their profile and obtain reports, add funds to their balance, interact with the company's special programs and communicate with company staff via chat, email or live video/audio.

Figure 9:
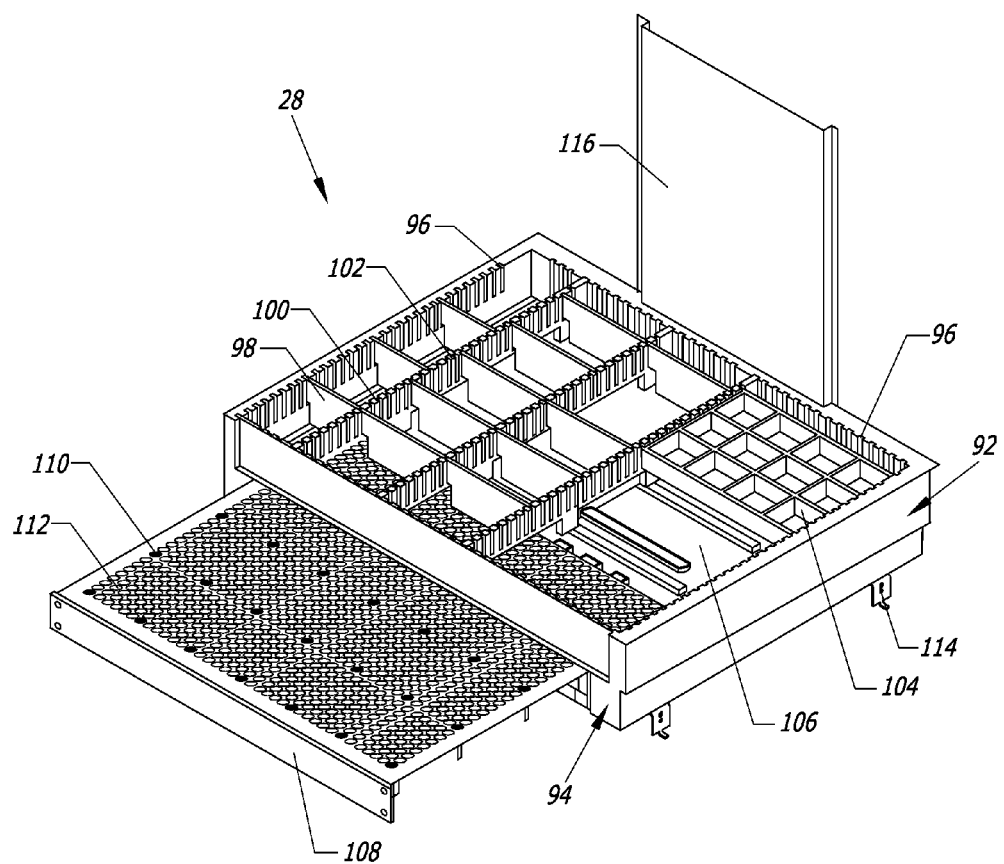
FIG. 9 is a perspective view of a tray used in accordance with the present invention.

With reference now to FIG. 9, in a particularly preferred embodiment, each tray or shelf 28 has an upper portion 92 and a base portion or unit 94. The upper unit 92 is substantially enclosed and has a plurality of spaced apart grooves formed in a wall thereof. The spaced apart grooves allow the selective positioning of horizontal and vertical dividers 98 and 100. As can be seen, at least one of the dividers includes spaced apart grooves 102 for the insertion of the other divider, in this case the horizontal divider 98. It is also contemplated by the present invention that prefabricated dividers 104 be used which provide a compartment of a fixed size. The benefit of the horizontal and vertical dividers 98 and 100 is that the size of the compartment for each item can be varied, such that the tray 28 can accommodate items of different sizes. For example, the prefabricated divider 104 may be useful for coffee K-cups, teabags, or other items of a set and given size. The larger dividers 98 and 100 can be used to form compartments which accommodate items of various sizes, including sandwiches, salads, boxed items, medicine, beauty products, etc. The dividers rest upon a shelf 106, which is typically of glass or other clear material, which bisects the upper and lower units 92 and 94.

In the embodiment illustrated in FIGS. 9-15, a sensor tray 108 having one or more sensors disposed therein is positioned within the base unit 94 of the tray 92. In a particularly preferred embodiment, photosensors 110 are disposed within one of an array of holes 112 sized and configured to receive the photosensors 110. The photosensors 110 are positioned such that there is a photosensor associated with each compartment formed by the dividers 98, 100 and 104. Thus, as the item overlies the light sensor 110, the light sensor is occluded from the light source positioned above the tray 92 and the photosensor is not activated. However, once the item is removed, light is received by the photosensor 110, which generates a signal which is received by the tray circuit board 86, and which is relayed to the main control board 90, and LCS 58.

Brackets 114 or the like are used to attach each shelf or tray 28 to the inside of each bay 22. A cover 116 may be used to position wires, leads, etc. extending from one tray 28 to another, or to the main control board 90.

With reference now to FIG. 10, a bottom view of the sensor array 108 is shown. It will be seen that the sensor array 108 includes a grid or array of apertures. Each row of apertures 118 is identified, such as with an ascending numeral as illustrated. Each column of apertures is similarly labeled, such as with alphabetical characters. Thus, each aperture of the array has a unique alpha-numeric designation representing the cross-section of the column and row for that aperture. This can be more clearly seen in FIG. 11.

As illustrated and described above, a photosensor 110, which may be disposed within a plug, as illustrated in FIG. 12, is disposed within a given and assigned aperture for the item within a compartment above which an item will be placed. Thus, typically, every aperture will not have a photosensor. Instead, depending upon the type of items and variety of different types of items in the compartments above, the photosensors 110 will be spaced so as to be generally centered with respect to the compartment and the item to be positioned within the compartment so as to be occluded from a light source shining from above the tray 28. FIG. 12 illustrates such a photosensor 110, or a photosensor disposed within a plug, in an inverted orientation, such that the opening of the photosensor is at the bottom of the illustration and lead wires 122 are connected to at least one bridge board 124 so as to relay the signal to the tray's circuit board 86.

Figure 13:
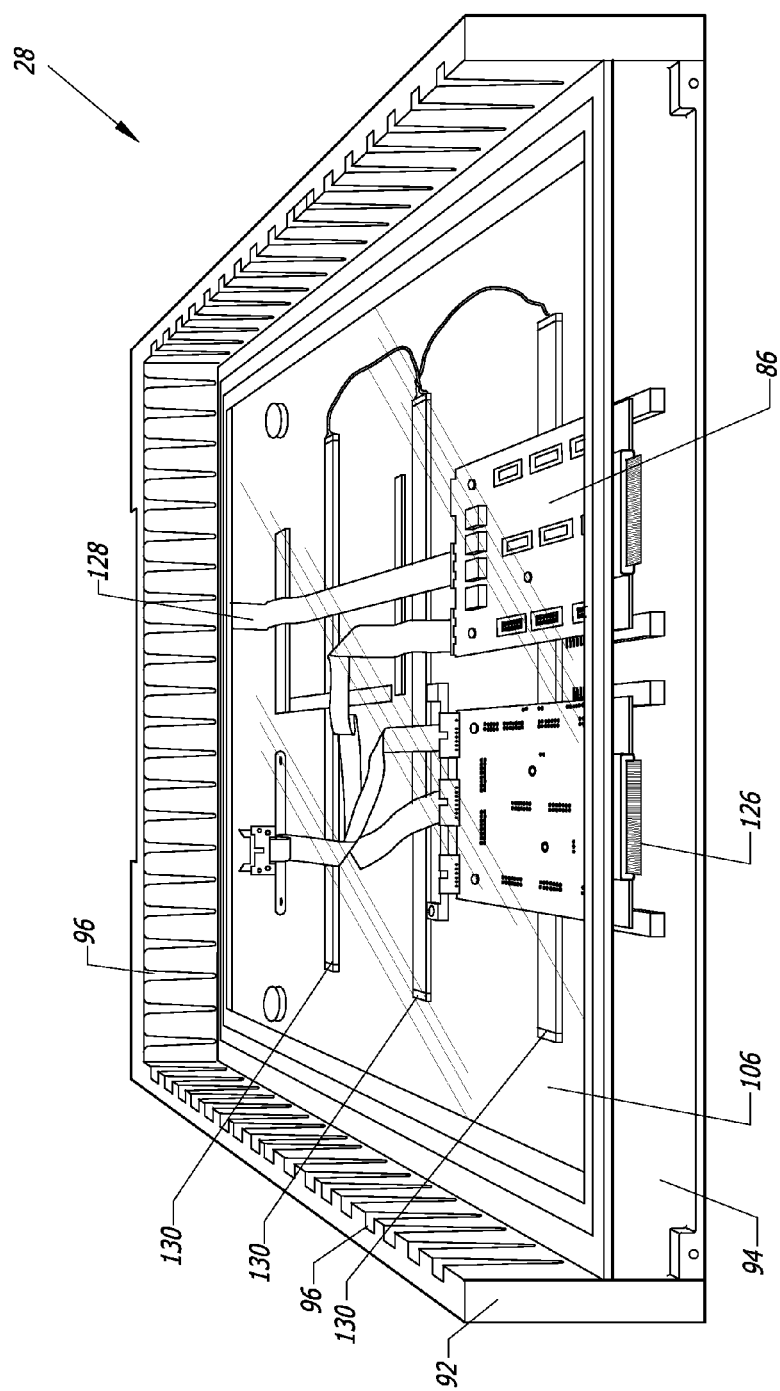
FIG. 13 is a perspective view of a portion of the tray, used in accordance with the present invention.

With reference now to FIG. 13, the base unit 94 of the tray 28 includes one or more tray circuit boards 86 disposed therein. A male bridge board plug 126 is insertable into the female receptacle socket 124 to form a bridge board when the sensor array tray 108 is slid into position so as to interconnect the one or more tray circuit boards 86 with the sensor board array 108. Ribbon wires 128 or the like provide interconnection and communication to the main control board 90.

Typically, LED lighting strips 130 are operably attached to the bottom of each tray 28 so as to illuminate the tray immediately below it. Of course, LED lighting strips or other sources of light can be provided to the uppermost tray, or to all trays 28.

Figure 14:
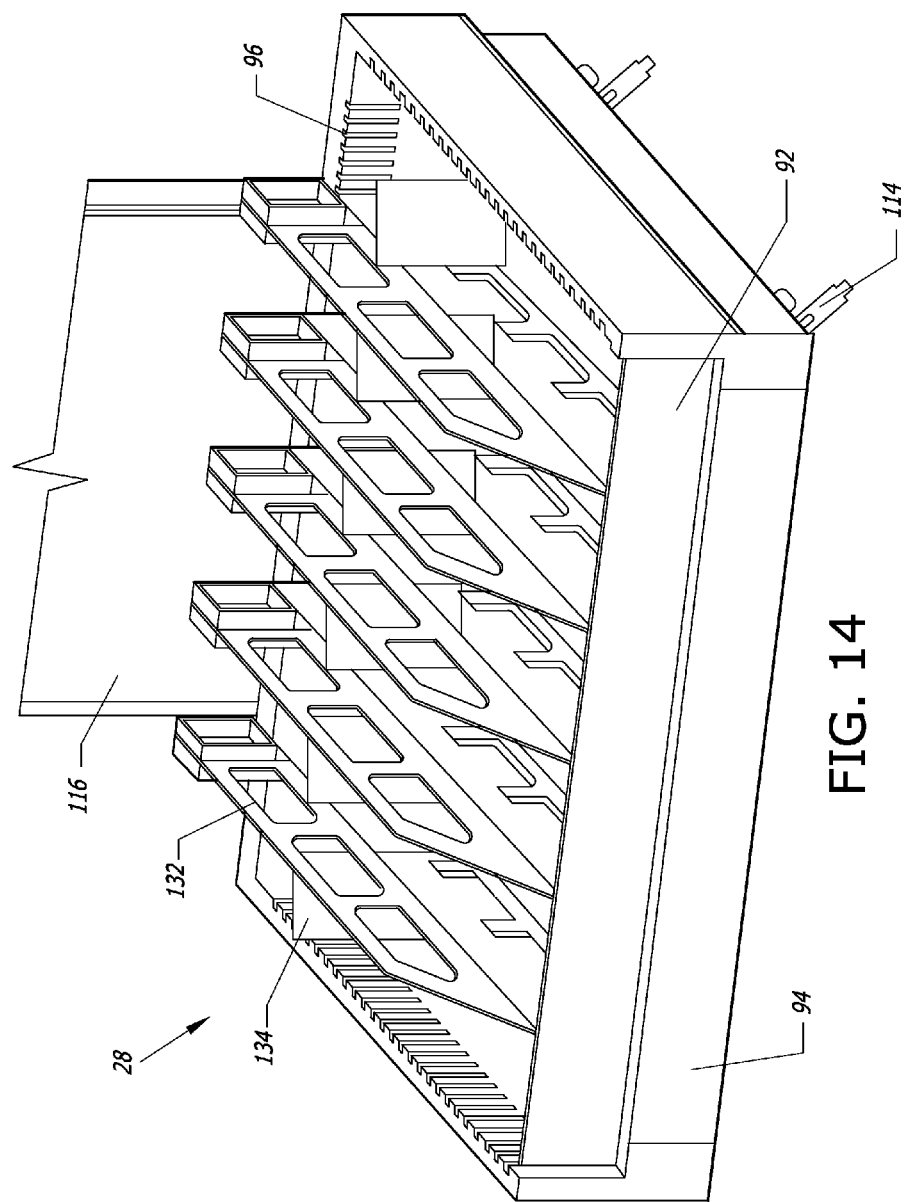
FIG. 14 is a perspective view of a tray having dividing rails and pushers, used in accordance with the present invention.
Figure 15:
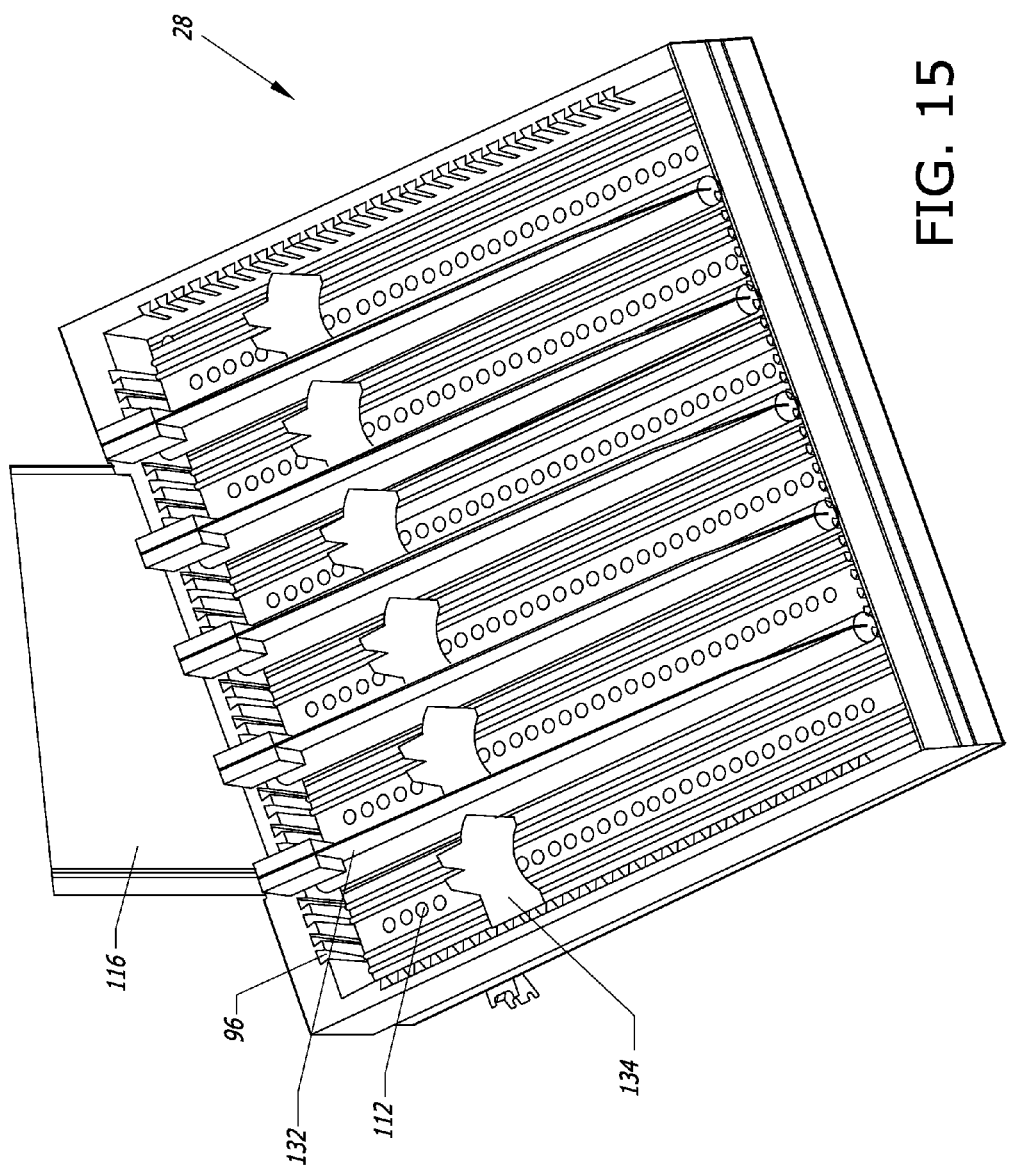
FIG. 15 is a top view of the tray of FIG. 14.

In the case of bottles, cans, or other items which can be positioned in line or in a stacked manner, and pushed forward after the removal of one of the bottles, cans, etc., a rail divider and biased pushing mechanism is provided within the tray 28, as illustrated in FIGS. 14 and 15. Rails 132 are inserted into the grooves 96 so as to form vertical dividers of a predetermined width corresponding to the item to be inserted between the rails. Thus, the rails 132 cooperatively form compartments therebetween. A slider-pusher unit 134 is biased, such as by a spring, to move forward towards the front of the tray 28, and push the row of cans, bottles, etc. towards the front. It will be appreciated that the number of rail dividers 132 can be modified according to the size of the can or bottle, so as to accept larger bottles or cans. Similarly, the slider-pusher 134 can be modified so as to be able to push the bottles, cans or any other items adequately, such as by attaching an extension member, providing a larger pushing surface for the slider-pusher 134, etc.

It will be seen from FIG. 15 that the slider-pusher 134 moves from a back end of the tray 28 towards a front end of the tray. As it does so, apertures of the sensor tray 108 disposed therebelow are exposed. Typically, a photosensor 110 will be disposed in the aperture which is towards the front of the tray 28, such that as the can or bottle is removed from the front of the row of bottles and cans, the photosensor is activated within a fraction of a second, as the pusher-slider unit 134 pushes the remaining row of bottles and cans towards the front of the tray 28. Alternatively, a row of photosensors 110 can be disposed along the length of the row of bottles and cans, and the photosensors actuated upon removal of the front-most can or bottle, exposing an aperture and photosensor at the rear in sequential order.

Using the photosensor system described above in relation to FIGS. 9-15, as soon as an item is removed from a compartment, so as to expose the photosensor 110 to a light source, a signal is generated. The system knows which photosensor 110 was activated, and the compartment to which it was assigned. From the specific compartment, and the previously arranged items with respect to the tray and sensor tray 108, the system is able to determine exactly which item was removed from which compartment, identify the item, and provide its cost to the customer in the virtual shopping cart. If the customer returns the item back to the compartment from which it was removed, then the shopping cart will delete that item from the shopping cart and not charge the customer for that item.

It will also be appreciated that the present invention could utilize other sensor technologies. For example, the bottom sensor in FIGS. 14 and 15 may consist of reed switches and the pusher unit may have a magnet attached to its bottom. Each position of the pusher 134 will activate a reed switch below. Based on the indication of which reed switch is activated, the system will determine the number of product units that remain in the slider-pusher compartment row.

Of course, the sensor tray can also be made to include RFID antennas and/or an NFC system or any other sensor technology which is capable of accurately and very specifically detecting the removal of a particular item from the tray 28. Utilization of different sensor technology will provide for the identification of each item removed, such as the removal of a tag attached to an item within the reading distance of an NFC or RFID sensor. However, the system when restocked has the items arranged so as to correspond with sensors within the tray 28 of that particular bay 22 so that the location and identity of the items may be tracked.

With reference now to FIG. 16, an RFID sensor tray 136 is shown. The sensor tray 136 typically includes a cover 138, a base 140, and an RFID antenna device 142 sandwiched between the cover 138 and base 140 so as to form a single unit. This unit, which is typically generally rectangular, replaces the sensor tray 108 illustrated in FIG. 10. Typically, it would still be slid into the appropriate slot or compartment of the base 92 of the tray 28, such as below the shelf 106. The tray 28 may still include dividers and compartments, as illustrated and described above with respect to FIG. 9, and tray circuit boards 86, as illustrated in FIG. 13, for other purposes such as controlling the degree of lighting within the bay, acting as an interface with the scanner or reader 26 associated with each bay 22, etc.

With continuing reference to FIG. 16, items 70 are disposed and arranged in the tray, typically within divided compartments, but utilizing the RFID technology of this embodiment this is not necessarily the case. Each item 70 has an RFID tag 144 attached thereto. When the item 70 is removed from the tray, as shown by the upward directional arrow in FIG. 16, a signal 146 indicates that the item 70 and RFID tag 144 have been removed, which is detected by the RFID antenna 142, which sends a signal via a cable 148 to an RFID reader 150. Typically, the RFID antenna device 142 periodically sends a signal 146 to detect the presence of the RFID tags 144 on the items 70 associated with that tray. When an item 70, and thus its attached RFID tag 144, is removed, this removal is detected and the signal sent to the reader 150.

The reader 150 may receive input from multiple RFID antenna devices 142. Typically, there is a single RFID antenna device 142 associated with each sensor tray 136, which is used for each tray 28 within a given bay 22. Thus, for example, one or two readers 150 may be required for each bay 22 depending upon the number of trays 28 within the bay 22. The reader 150 then relays this information to the LCS 58.

The identity of the item 70 is determined. This may be due to its placement within a compartment on the tray 136, the fact that all items on a given tray 136 are the same, or the RFID tag 144 specifying the identity of the item 70, or by any other satisfactory means. In this manner, the identity of the item and its cost is provided to the customer in the virtual shopping cart 64.

With reference now to FIG. 17, it is contemplated by the present invention that the ASO be configured so as to create a variation of micro-market or mini-store. This can allow companies to operate consumer outlets such as micro markets, neighborhood markets and convenience stores or other general store-type outlets in an unattended and fully automated fashion. This can be, for example, in a strip mall, in a dedicated room of a building, a sufficiently large open area of a building, etc. One or more check-in stations 12 will be provided for customer identification and payment authorization and qualification. Thereafter, multiple customers may shop within the micro market simultaneously, gaining access to and removing items from bays 22 as desired, with the ASO system tracking the removal of each item from each bay by each customer which access that particular bay through the locked door 24. As only one customer can access a given bay 22 at any given time, multiple customers may shop simultaneously while an accurate record is kept of each customer's purchased items.

Thus, in addition to ready-to-eat food and beverage business type locations with smaller ASOs, the invention can also be used to operate a self-checkout, automated neighborhood market or convenience store or any other type of store which offers off-the-shelf consumer goods. The invention and its method allows consumers to enter the store's facility using various identification systems, as described above, and conduct their shopping by using the invention's method, to open bays' doors inside the store and to remove products from the trays 28 therein. The system recognizes the customer who opens the door and removes the items, as well as identifying which items were removed and then charges the customer for the cost of the removed items accordingly.

Such automated establishments can be used twenty-four hours a day, seven days a week without the expense of employees being present and within a convenient, automated and easy-to-use self-checkout friendly environment. These types of automated checkout, automated minimarket or convenience stores can offer various types of consumer goods and be very desirable in residential neighborhoods, colleges, military bases, airports, office complexes, malls and any other areas that are open or generally accessible to the general public twenty-four hours a day. Accordingly, such needs for quick, unattended, automated checkout stores that can operate around the clock without the expenses of attending personnel are very desirable and can be fulfilled by this invention.

As far as security measures, one or more turnstiles may be provided to control customer access and exiting, or a locked door or the like in order to enter a large ASO micro market or neighborhood store. The locked doors, turnstiles, etc. may be used to require the customers to scan their cards, provide other identification, etc. in order to enter and exit the ASO and in order to identify customers who removed items in values that exceed the initial balance on their card or account before beginning the shopping session.

Aside from being used as a store and shopping system, the system of the present invention could be used in any environment which requires maintaining records of individuals who remove items from shelves and the identification of the items removed. Such environments may be within schools, companies, laboratories, hospitals and pharmaceutical facilities, or within any other establishments or facilities, in order to track the removal of the inventory of parts and accessories, supplies or any other items. The system records the identification of each person that removed items from the bays and trays, including the date and time and maintains a full inventory of all products placed on or removed from the universal trays and provides full restocking reports as needed.

Although several embodiments have been described in detail for purposes of illustration, various modifications may be made without departing from the scope and spirit of the invention. Accordingly, the invention is not to be limited, except as by the appended claims.

What is claimed is:

1. A method for distributing items from a computer controlled, unattended, automated store outlet machine, comprising the step of:
   providing a computer-controlled, automated store outlet machine having at least one bay containing items removable from the bay for purchase in a purchase transaction, a check-in station, an electronic unit associated with each bay, at least one tray disposed within each bay for holding the items, and at least one sensor for detecting removal or return of individual items from or to the at least one bay, wherein each bay includes a door providing access for the customer to selectively manually remove and return the items contained within the bay prior to purchase by the customer;
   receiving at least one of customer identification and/or payment information from the customer into the electronic unit associated with each bay of the automated store outlet;
   unlocking the door of the at least one bay to provide access to the items contained within the bay after at least one of the customer identification and/or payment information is received from the customer;
   detecting using the at least one sensor the manual removal by the customer of the one or more items from the at least one bay;
   identifying each removed item based on a database of information for each item in each tray of each bay;
   adding the identification of each manually removed item to a virtual shopping cart associated with the customer in response to the detecting of each removed item using the at least one sensor, the automated store outlet machine further configured to detect using the at least one sensor the manual return of one or more removed items by the customer to the at least one tray disposed within the bay prior to purchase of any removed items by the customer and to remove each manually returned item from the virtual shopping cart of the customer in response to the detecting of said returned item using the at least one sensor;
   automatically locking the door of the at least one bay after the customer has completed removing items from and returning items to the at least one bay; and
   closing the purchase transaction after the last opened door of the at least one bay by the customer is automatically locked and charging the customer for all removed items.

2. The method of claim 1, wherein the receiving customer identification step includes the step of receiving at least one of a customer identification code and/or password, an electronically readable card or electronic device, or biometric information of the customer.

3. The method of claim 1, wherein the step of receiving customer payment information comprises the step of receiving at least one of information relating to a previously created customer automated store dedicated account, credit card or debit card or financial account information, cash deposited by the customer into a cash receiving device at the automated store outlet, or electronically transferred funds.

4. The method of claim 1, wherein the unlocking door step includes the steps of receiving customer identification at an electronic unit associated with the door of the at least one bay before unlocking the door of the at least one bay.

5. The method of claim 4, wherein the electronic unit comprises a device having at least one of an electronic display, a keypad, an RFID, NFC or other identification technology reader, an electronic image reader, a credit/debit card reader, a biometric reader and/or a motion detector.

6. The method of claim 1, wherein the removal of each item is detected by at least one of a mechanical, electrical, electronic or optical detection system of the automated store outlet.

7. The method of claim 1, wherein the removal of each item is detected by electronically sensing a tag associated with each item within the bay.

8. The method of claim 1, wherein the detecting the removal of the one or more items from the bay step comprises the steps of associating an RFID tag with each item in the bay, and utilizing a corresponding RFID detector to detect the existence or movement of the item from the bay.

9. The method of claim 8, wherein the RFID detector comprises a RFID antenna sandwiched between a cover and a base forming a sensor tray positioned relative to the one or more items that are placed over the RFID detector so as to allow RFID detection of the existence or movement of the one or more items from the bay.

10. The method of claim 1, wherein the at least one sensor comprises a light sensor disposed relative to the item on the tray and exposed to light when the item is removed from the tray of the bay.

11. The method of claim 10, including the step of forming divided tray compartments, each compartment having associated therewith a single item and a designated sensor.

12. The method of claim 1, including the step of providing a receipt for the items purchased.

13. The method of claim 12, including the step of electronically sending a receipt to the customer.

14. The method of claim 12, including the step of printing a receipt for the customer.

15. The method of claim 1, including the step of displaying the identification of the removed item and its purchase price on a computer-controlled display unit of the automated store outlet.

16. The method of claim 1, wherein the closing of the purchase transaction step comprises at least one of receiving into the check-in station or electronic unit of the automated store outlet a manual instruction from the customer to close the transaction and charge the customer for the removed items, or automatically closing the transaction and charging the customer for the removed items after a predetermined period of customer inactivity.

17. The method of claim 1, wherein the receiving at least one of customer identification and/or payment information step includes the step of receiving into at least one of the check-in station or the electronic unit at least one of a password or QR code obtained and displayed on a mobile electronic device of the customer.

18. The method of claim 1, including the step of displaying the virtual shopping cart of the customer on a mobile electronic device of the customer while the customer is using the automated store outlet.

19. The method of claim 18, wherein the purchase transaction is closed using the mobile electronic device.

20. The method of claim 1, including the step of the automated store outlet electronically communicating with a remote central control center.

21. The method of claim 20, wherein the central control center provides at least one of customer identification, payment verification and payment processing.

22. The method of claim 20, including the step of relaying purchase data from the automated store outlet to the central control center.

23. The method of claim 22, including the step of using the central control center to monitor sales activities and create reports.

24. The method of claim 20, including the step of using the central control center to monitor and assist with the activities of the automated store outlet.

25. The method of claim 1, including the step of providing remote live customer service assistance to a customer using the automated store outlet.

26. The method of claim 1, including the step of monitoring the automated store outlet with surveillance devices.

27. The method of claim 1, including the step of displaying at least one of instructions or advertisements on a monitor associated with the automated store outlet.

28. The method of claim 3, including the step of receiving electronically transferred funds into the customer automated store dedicated account.

29. The method of claim 1, including the step of qualifying the customer to access the at least one bay and remove one or more items from the at least one bay by determining that the customer payment information is of a sufficient level to purchase items from the at least one bay.

30. The method of claim 1, including the step of adding items removed by a customer from multiple bays to the virtual shopping cart, wherein the shopping cart transfers from bay to bay and a single purchase transaction can be closed for all items removed from all bays of the automated store outlet by the customer.

31. The method of claim 1, including the steps of unlocking the door of one or more bays of a number of bays of the automated store outlet to provide simultaneous access to the items contained within the one or more bays to multiple customers at most being equal in number to the number of bays, and tracking and charging each customer respectively for all the items removed from the one or more bays by each customer.

32. A method for distributing items from a computer-controlled, automated store outlet machine, comprising the step of:
    providing a computer-controlled, automated store outlet having at least one bay containing items removable from the bay for purchase in a purchase transaction, an electronic access unit associated with each bay, at least one tray disposed within each bay for holding the items, and at least one sensor for detecting the removal of individual items from and the return of individual items to the at least one bay, wherein each bay includes a door providing access for the customer to selectively manually remove and return the items contained within the bay prior to purchase by the customer;
    receiving at least one of customer identification and/or payment information from the customer into the electronic unit associated with the at least one bay of the automated store outlet;
    unlocking the door of the at least one bay to provide access to the items contained within the bay after at least one of the customer identification and/or payment information is received from the customer;
    detecting using the at least one sensor the manual removal by the customer of the one or more items from the at least one bay;
    identifying each removed item based on a database of information for each item in each tray of each bay;
    adding the identification of each manually removed item to a virtual shopping cart associated with the customer in response to the detecting of each removed item using the at least one sensor, the automated store outlet further configured to detect using the at least one sensor the manual return of one or more removed items by the customer to the at least one tray disposed within the bay prior to purchase of any removed items by the customer and to remove each manually returned item from the virtual shopping cart of the customer in response to the detecting of said returned item using the at least one sensor;
    automatically locking the door of the at least one bay after the customer has completed removing items from and returning items to the at least one bay; and
    closing the purchase transaction after the door of the at least one bay is automatically locked and charging the customer for any remaining removed items once a predetermined period of time has elapsed after automatically locking the door of the at least one bay or in response to manually receiving customer approval of the purchase transaction at the automated store outlet.

33. The method of claim 32, wherein the receiving customer identification step includes the step of receiving at the electronic unit at least one of a customer identification code and/or password, an electronically readable card or electronic device, or biometric information of the customer.

34. The method of claim 32, wherein the step of receiving customer payment information comprises the step of receiving at the electronic unit at least one of information relating to a previously created customer automated store dedicated account, credit card or debit card.

35. The method of claim 32, wherein the electronic unit comprises a device having at least one of an electronic display, a keypad, an RFID, NFC or other identification technology reader, an electronic image reader, a credit/debit card reader, a biometric reader and a motion detector.

36. The method of claim 32, wherein the removal of each item is detected by at least one of a mechanical, electrical, electronic or optical detection system of the automated store outlet.

37. The method of claim 32, wherein the removal of each item is detected by electronically sensing a tag associated with each item within the bay.

38. The method of claim 32, wherein the detecting the removal of the one or more items from the bay step comprises the steps of associating an RFID tag with each item in the bay, and utilizing a corresponding RFID detector to detect the existence or movement of the item from the bay.

39. The method of claim 38, wherein the RFID detector comprises a RFID antenna sandwiched between a cover and a base forming a sensor tray positioned relative to the one or more items that are placed over the RFID detector so as to allow RFID detection of the existence or movement of the one or more items from the bay.

40. The method of claim 32, wherein the at least one sensor comprises a light sensor disposed relative to the item on the tray and exposed to light when the item is removed from the tray of the bay.

41. The method of claim 40, including the step of forming divided tray compartments, each compartment having associated therewith a single item and a single photosensor.

42. The method of claim 32, wherein the return of each item is detected by at least one of a mechanical, electrical, electronic or optical detection system of the automated store outlet.

43. The method of claim 32, including the step of providing a receipt for the items purchased.

44. The method of claim 43, including the step of electronically sending a receipt to the customer.

45. The method of claim 43, including the step of printing a receipt for the customer.

46. The method of claim 32, including the step of displaying the identification of the removed item and its purchase price on a computer-controlled display unit of the automated store outlet.

47. The method of claim 32, wherein the closing of the purchase transaction step comprises at least one of receiving into the electronic unit manual instruction from the customer to close the transaction and charge the customer for the removed items, or automatically closing the transaction and charging the customer for the removed items after a predetermined period of customer inactivity.

48. The method of claim 32, wherein the receiving at least one of customer identification and/or payment information step includes the step of receiving into the electronic unit at least one of a password or QR code obtained and displayed on a mobile electronic device of the customer.

49. The method of claim 32, including the step of displaying the virtual shopping cart of the customer on a mobile electronic device of the customer while the customer is using the automated store outlet.

50. The method of claim 49, wherein the purchase transaction is closed using the mobile electronic device.

51. The method of claim 32, including the step of the automated store outlet electronically communicating with a remote central control center.

52. The method of claim 51, wherein the central control center provides at least one of customer identification, payment verification and payment processing.

53. The method of claim 51, including the step of relaying purchase data from the automated store outlet to the central control center.

54. The method of claim 53, including the step of using the central control center to monitor sales activities and create reports.

55. The method of claim 51, including the step of using the central control center to monitor and assist in the activities of the automated store outlet.

56. The method of claim 32, including the step of providing live customer service assistance to a customer using the automated store outlet.

57. The method of claim 32, including the step of monitoring the automated store outlet with surveillance devices.

58. The method of claim 32, including the step of displaying at least one of instructions or advertisements on a monitor associated with the automated store outlet.

59. The method of claim 34, including the step of receiving electronically transferred funds into the customer automated store dedicated account.

60. The method of claim 32, including the step of qualifying the customer to access the at least one bay and manually remove one or more items from the at least one bay by determining that the customer payment information is of a sufficient level to purchase items from the at least one bay.

61. The method of claim 32, including the step of adding items removed by a customer from multiple bays to the virtual shopping cart, wherein a single purchase transaction can be closed for all items removed from all bays of the automated store outlet by the customer.

62. The method of claim 32, including the steps of unlocking the door of a first bay of the automated store outlet to provide access to a first customer to the items contained within the first bay and unlocking the door of a second bay of the automated store outlet to provide simultaneous access to a second customer to the items contained within the second bay, and tracking the items removed from the first and second bays by each customer.

63. A method for distributing items from a computer controlled, automated store outlet, comprising the step of:
providing a computer-controlled, automated store outlet machine having at least one bay containing items removable from the bay for purchase in a purchase transaction, an electronic access unit associated with each bay, and at least one tray disposed within each bay for holding the items, wherein each bay includes a door providing access for the customer to selectively manually remove and return the items contained within the bay prior to purchase by the customer;
receiving at least one of customer identification and/or payment information from the customer into the electronic unit associated with the at least one bay of the automated store outlet;
unlocking the door of the at least one bay to provide access to the items contained within the bay after at least one of the customer identification and/or payment information is received from the customer;

receiving a machine readable code on each item manually removed by the customer from the at least one bay into a scanner of the automated store outlet, and identifying each removed item based on a database of information for each item in each tray of each bay;

adding the identification of each manually removed item to a virtual shopping cart associated with the customer in response to the detecting of each removed item using the scanner, the automated store outlet further configured to detect using the scanner the manual return of one or more removed items by the customer to the at least one tray disposed within the bay prior to purchase of any removed items by the customer and to remove each manually returned item from the virtual shopping cart of the customer in response to the detecting of said returned item using the scanner;

automatically locking the door of the at least one bay after the customer has completed removing items from the at least one bay; and closing the purchase transaction after the door of the at least one bay is automatically locked and charging the customer for any remaining removed items once a predetermined period of time has elapsed after automatically locking the door of the at least one bay.

* * * * *